US008604938B2

(12) United States Patent
Feldstein et al.

(10) Patent No.: US 8,604,938 B2
(45) Date of Patent: *Dec. 10, 2013

(54) USER INTERFACE CABLE CLAMP-ON DEVICE

(71) Applicants: George Feldstein, Cresskill, NJ (US); Mark LaBosco, New City, NY (US); Esteban Dragonanovic, Nyack, NY (US); Philip Bellingham, White Plains, NY (US)

(72) Inventors: George Feldstein, Cresskill, NJ (US); Mark LaBosco, New City, NY (US); Esteban Dragonanovic, Nyack, NY (US); Philip Bellingham, White Plains, NY (US)

(73) Assignee: Creston Electronics Inc., Rockleigh, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,216

(22) Filed: Feb. 11, 2013

(65) Prior Publication Data

US 2013/0155329 A1    Jun. 20, 2013

Related U.S. Application Data

(63) Continuation of application No. 13/073,125, filed on Mar. 28, 2011, now Pat. No. 8,390,467, which is a continuation-in-part of application No. 13/005,102, filed on Jan. 12, 2011, now Pat. No. 8,390,466.

(51) Int. Cl.
*G08B 21/00*   (2006.01)

(52) U.S. Cl.
USPC ........................... 340/654; 340/635; 324/425

(58) Field of Classification Search
USPC .......................................... 340/654
See application file for complete search history.

(56) References Cited

U.S. PATENT DOCUMENTS

| | | | |
|---|---|---|---|
| 4,031,449 A | 6/1977 | Trombly | |
| 4,645,996 A | 2/1987 | Toops | |
| 4,727,600 A | 2/1988 | Avakian | |
| 4,882,743 A | 11/1989 | Mahmoud | |
| 4,915,645 A | 4/1990 | Konnemann et al. | |
| 4,975,926 A | 12/1990 | Knapp | |
| 5,341,083 A | 8/1994 | Klontz et al. | |
| 5,550,979 A * | 8/1996 | Tanaka et al. | 709/209 |
| 5,796,352 A * | 8/1998 | Tanaka et al. | 340/4.41 |
| 5,802,300 A * | 9/1998 | Tanaka et al. | 709/222 |
| 6,081,356 A | 6/2000 | Branc et al. | |
| 6,086,007 A | 7/2000 | Till | |
| 6,633,281 B2 | 10/2003 | Lin et al. | |
| 6,778,845 B2 | 8/2004 | Kaegebein | |
| 7,568,945 B2 | 8/2009 | Chee et al. | |
| 7,719,438 B2 | 5/2010 | Hardacker et al. | |
| 7,731,516 B2 | 6/2010 | Puttinger et al. | |
| 7,779,516 B2 | 8/2010 | Morris | |
| 7,797,176 B2 | 9/2010 | Miyashita | |
| 7,806,723 B2 | 10/2010 | Chong et al. | |
| 7,811,365 B2 | 10/2010 | Grzonka et al. | |
| 7,821,250 B2 | 10/2010 | Turner et al. | |
| 8,149,102 B1 * | 4/2012 | Miller et al. | 340/506 |
| 8,390,466 B2 * | 3/2013 | Feldstein et al. | 340/654 |
| 8,390,467 B2 * | 3/2013 | Feldstein et al. | 340/654 |

(Continued)

*Primary Examiner* — Travis Hunnings
(74) *Attorney, Agent, or Firm* — Creston Electronics Inc.

(57) ABSTRACT

In an illustrative embodiment, a system comprises an A/V switcher that is configured to monitor a presence of an A/V signal in a cable and transmit data regarding said A/V signal presence. A cable clamp-on device is coupled to the cable and includes at least one indicator for displaying said A/V signal presence, and a transceiver configured to receive the data regarding said A/V signal presence.

8 Claims, 23 Drawing Sheets

(56) References Cited

U.S. PATENT DOCUMENTS

| | | |
|---|---|---|
| 2002/0128041 A1 | 9/2002 | Parry |
| 2003/0103075 A1 | 6/2003 | Rosselot |
| 2004/0014357 A1 | 1/2004 | Madera et al. |
| 2005/0213739 A1 | 9/2005 | Rodman et al. |
| 2006/0005988 A1 | 1/2006 | Jorgensen |
| 2006/0047557 A1 | 3/2006 | Bieselin et al. |
| 2007/0153128 A1 | 7/2007 | Adcock et al. |
| 2008/0079569 A1 | 4/2008 | Axelsen |
| 2009/0112671 A1 | 4/2009 | Grodum |
| 2012/0154140 A1* | 6/2012 | Blanchard .................. 340/539.1 |
| 2012/0176247 A1* | 7/2012 | Feldstein et al. .............. 340/654 |
| 2012/0177377 A1 | 7/2012 | Feldstein |

* cited by examiner

| Location | Priority Level |
|---|---|
| Conference Room A (Rockleigh, NJ, Bldg. 22, Room 233) | 1 |
| Conference Room B (Rockleigh, NJ, Bldg. 22, Room 234) | 2 |
| Conference Room A (Shanghai, China, Bldg 1, Room 2) | 3 |

| Conference Room A (Rockleigh, NJ, Bldg. 22, Room 233) | | |
|---|---|---|
| Clamp # | Priority Level | Status Indicator |
| Cable Clamp 1 | 1 | Enabled |
| Cable Clamp 2 | 4 | Disabled |
| Cable Clamp 3 | 5 | Disabled |
| Cable Clamp 4 | 6 | Enabled |
| Cable Clamp 5 | 7 | Enabled |
| Cable Clamp 6 | 8 | Enabled |
| Cable Clamp 7 | 2 | Enabled |
| Cable Clamp 8 | 3 | Enabled |
| Cable Clamp 9 | 9 | Enabled |
| Cable Clamp 10 | 10 | Disabled |
| | | |
| | | |
| | | |
| Conference Room B (Rockleigh, NJ, Bldg. 22, Room 234) | | |
| Clamp # | Priority Level | Status Indicator |
| Cable Clamp 1 | 1 | Disabled |
| Cable Clamp 2 | 2 | Disabled |
| Cable Clamp 3 | 3 | Disabled |
| Cable Clamp 4 | 4 | Enabled |
| Cable Clamp 5 | 5 | Enabled |
| Cable Clamp 6 | 6 | Disabled |
| | | |
| | | |
| | | |
| Conference Room A (Shanghai, China, Bldg 1, Room 2) | | |
| Clamp # | Priority Level | Status Indicator |
| Cable Clamp 1 | 1 | Enabled |
| Cable Clamp 2 | 2 | Enabled |
| Cable Clamp 3 | 3 | Enabled |

FIG. 19

| Conference Room A (Rockleigh, NJ, Bldg. 22, Room 233) | | |
|---|---|---|
| Clamp # | Priority Level | Status Indicator |
| Cable Clamp 1 | 1 | Enabled |
| Cable Clamp 2 | 4 | Disabled |
| Cable Clamp 3 | 5 | Disabled |
| Cable Clamp 4 | 6 | Enabled |
| Cable Clamp 5 | 7 | Enabled |
| Cable Clamp 6 | 8 | Enabled |
| Cable Clamp 7 | 2 | Enabled |
| Cable Clamp 8 | 15 | Enabled |
| Cable Clamp 9 | 9 | Enabled |
| Cable Clamp 10 | 10 | Disabled |
| | | |
| | | |
| | | |
| Conference Room A (New York, NY, Room 18) | | |
| Clamp # | Priority Level | Status Indicator |
| Cable Clamp 11 | 11 | Disabled |
| Cable Clamp 12 | 12 | Disabled |
| Cable Clamp 13 | 13 | Disabled |
| Cable Clamp 14 | 14 | Enabled |
| Cable Clamp 15 | 3 | Enabled |
| Cable Clamp 16 | 16 | Disabled |
| | | |
| | | |
| | | |
| Conference Room A (Shanghai, China, Bldg 1, Room 2) | | |
| Clamp # | Priority Level | Status Indicator |
| Cable Clamp 17 | 17 | Enabled |
| Cable Clamp 18 | 18 | Enabled |
| Cable Clamp 19 | 19 | Enabled |

*FIG. 20*

USER INTERFACE CABLE CLAMP-ON DEVICE

BACKGROUND OF THE INVENTION

1. Technical Field

The invention relates to communication systems, and more particularly to a plurality of cable clamp user interface for effecting teleconferencing functions including control of transmission and reception of audio and video information.

2. Background Art

The advent of commercially available digital communication links carries with it the ability to add new dimensions to the functions effected by a communication system. One aspect of these new dimensions is a teleconferencing function. In teleconferencing, conference participants are brought together via a communication link for the purpose of information interchange. The "tele" prefix to the word telecommunications implies that one or more of the participants is remotely located from other of the participants in the conference. Teleconferencing is achieved so as to give the perception that there is no distance barrier between participants who may actually be widely separated.

In teleconferencing, a conference participant typically uses a computer for different functions to exchange information, which can be problematic. For example, in a conference room environment, computers are connected to a wide variety of audio and visual equipment. Often there are cables located near conference room tables for plugging in computers, audio visual (AV) sources, and other conference room devices.

Once the cable is plugged into the computer, the user turns on the conference room device by using a controller. The user interacts with the controller, for example, to manage video and audio switchers to route a particular signal source that is connected to the computer to one of the conference room devices; for example, a projector screen. Often, there are problems associated with plugging in the cable and using the controller. For example, the user may plug a cable into the computer without knowing whether there is an active signal in the cable. The user attempts to fix the inactive signal by using the computer to activate the signal in the cable. Further, the user may not be familiar with how to use the controller. The attempted use of an unfamiliar controller or plugging a cable with an inactive signal into a computer often results in delays and/or calls to technical support personnel. Problems that are not quickly resolved often require dispatching someone to the conference room. As a result, valuable time and resources are lost in many conferences while room coordinators are located, equipment power is cycled, and help is summoned.

Therefore, there is a need in the art for systems and methods for resolving conflicts when multiple controllers are activated simultaneously and enhanced a user's setup experience in a multiple conference room environment for teleconferencing.

SUMMARY OF THE INVENTION

It is to be understood that both the general and detailed descriptions that follow are exemplary and explanatory only and are not restrictive of the invention.

DISCLOSURE OF INVENTION

Principles of the invention provide systems and methods for controlling and resolving conflicts of a plurality of conference room devices located in multiple conference rooms. For example, in the first aspect of the invention, a system comprises an A/V switcher being configured to monitor a presence of an A/V signal in a cable and transmit data regarding said A/V signal presence. The system further includes a cable clamp-on device that is coupled to the cable and includes at least one indicator to display said A/V signal presence, and a transceiver to receive the data regarding said A/V signal presence.

In a second aspect of the invention, a method comprises the steps of detecting a presence of an A/V signal in a cable, in response to the detection of the A/V signal, activating at least one indicator, and in response to the non-detection of the A/V signal, deactivating the at least one indicator.

The present invention seeks to overcome or at least ameliorate one or more of several problems, including but not limited to: controlling a plurality of conference room devices that are located in multiple teleconferencing sites.

BRIEF DESCRIPTION OF DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

BRIEF DESCRIPTION OF THE SEVERAL VIEWS OF THE DRAWINGS

Figure 1:
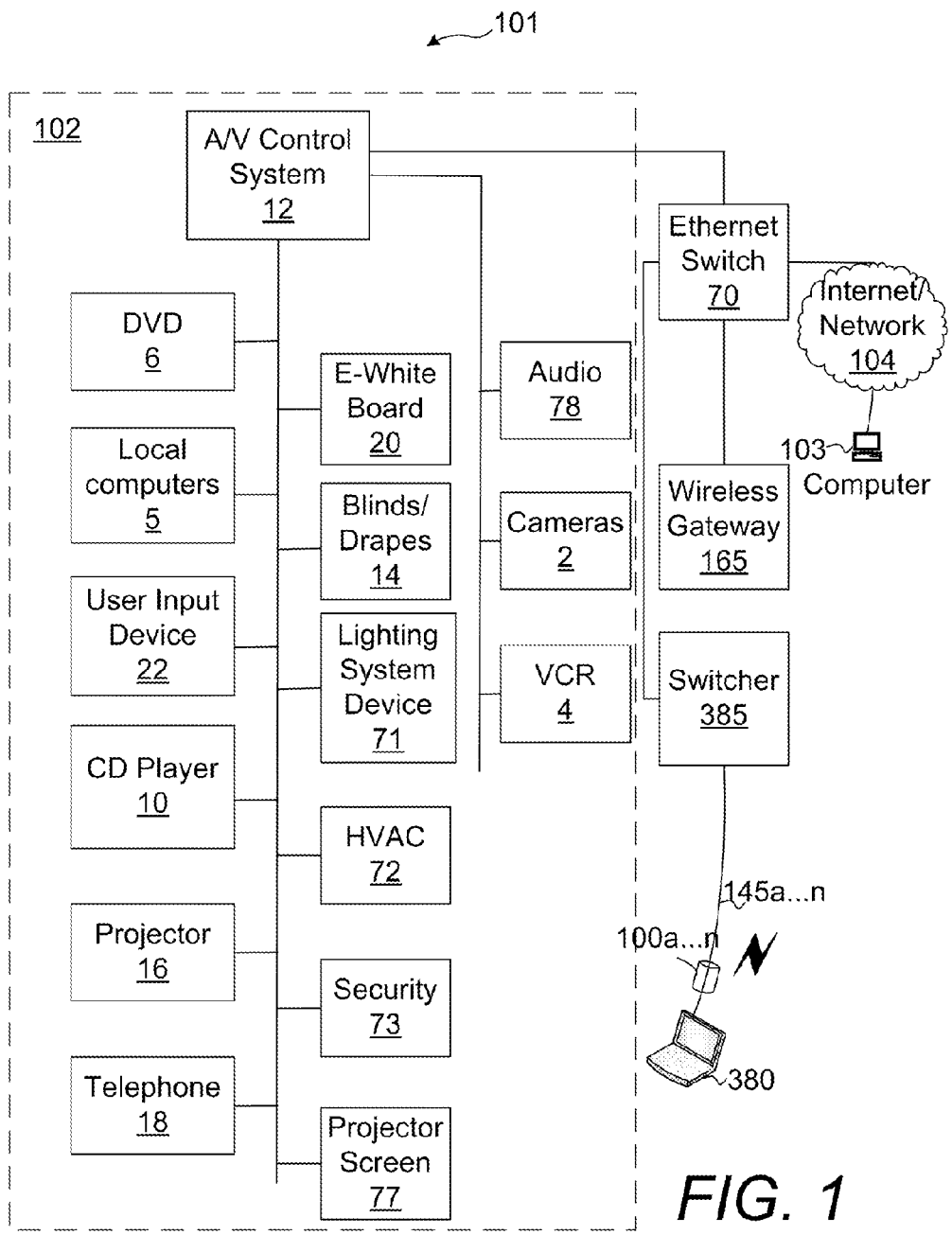

FIG. 1 illustrates a block diagram of a conference room with conference room devices in accordance with an illustrative embodiment of the present invention.

Figure 2:
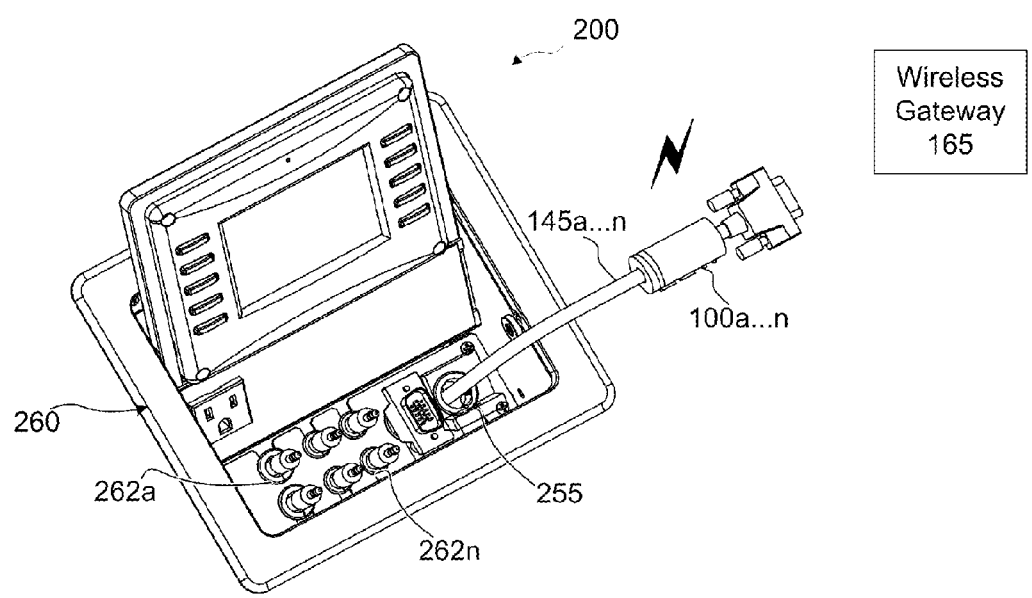

FIG. 2 illustrates a view of a system incorporating an inventive cable clamp-on device in accordance with an illustrative embodiment of the present invention.

Figure 3:
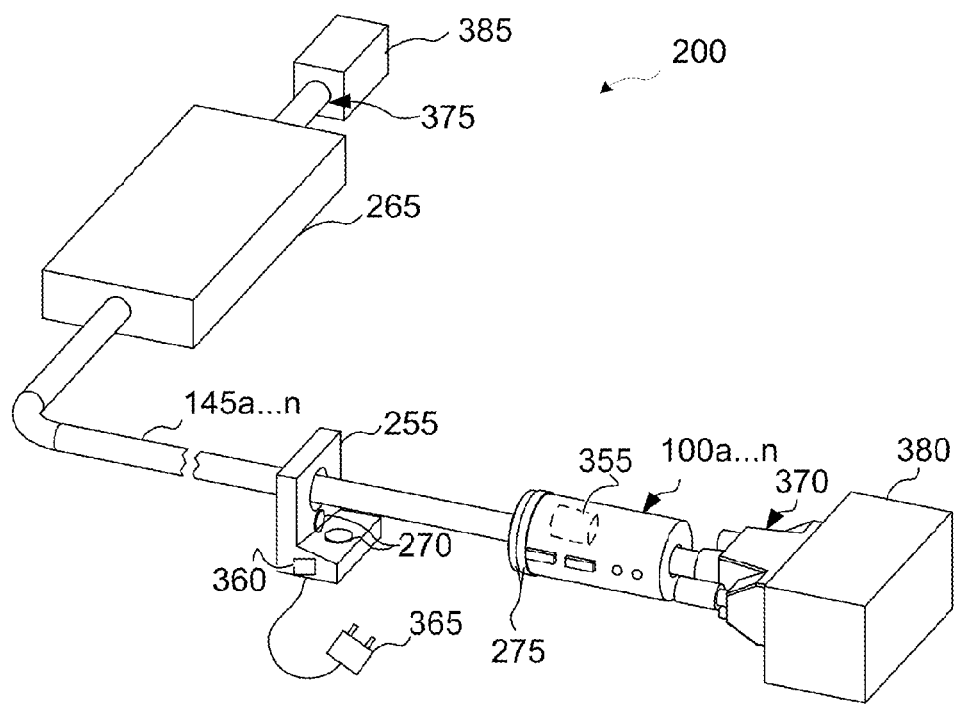

FIG. 3 is another view of the system in accordance with an illustrative embodiment of the present invention.

Figure 4:
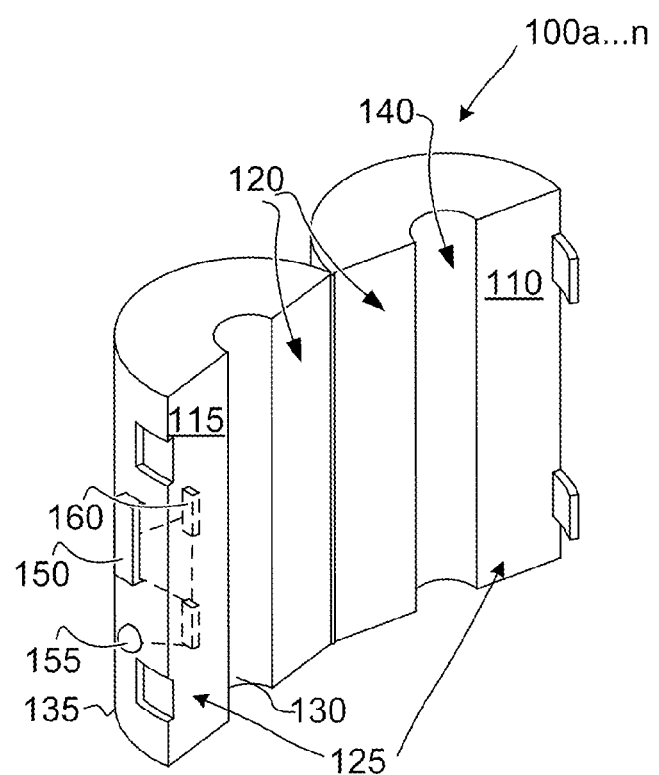

FIG. 4 illustrates an interior view of the cable clamp-on device in accordance with an illustrative embodiment of the present invention.

Figure 5:
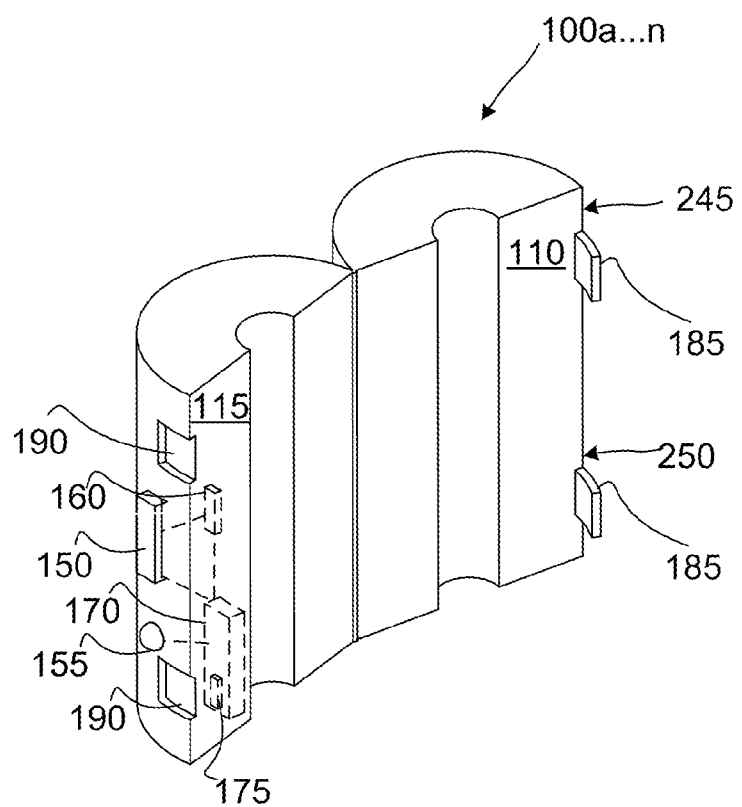

FIG. 5 illustrates another interior view of a cable clamp-on device in accordance with an illustrative embodiment of the present invention.

Figure 6:
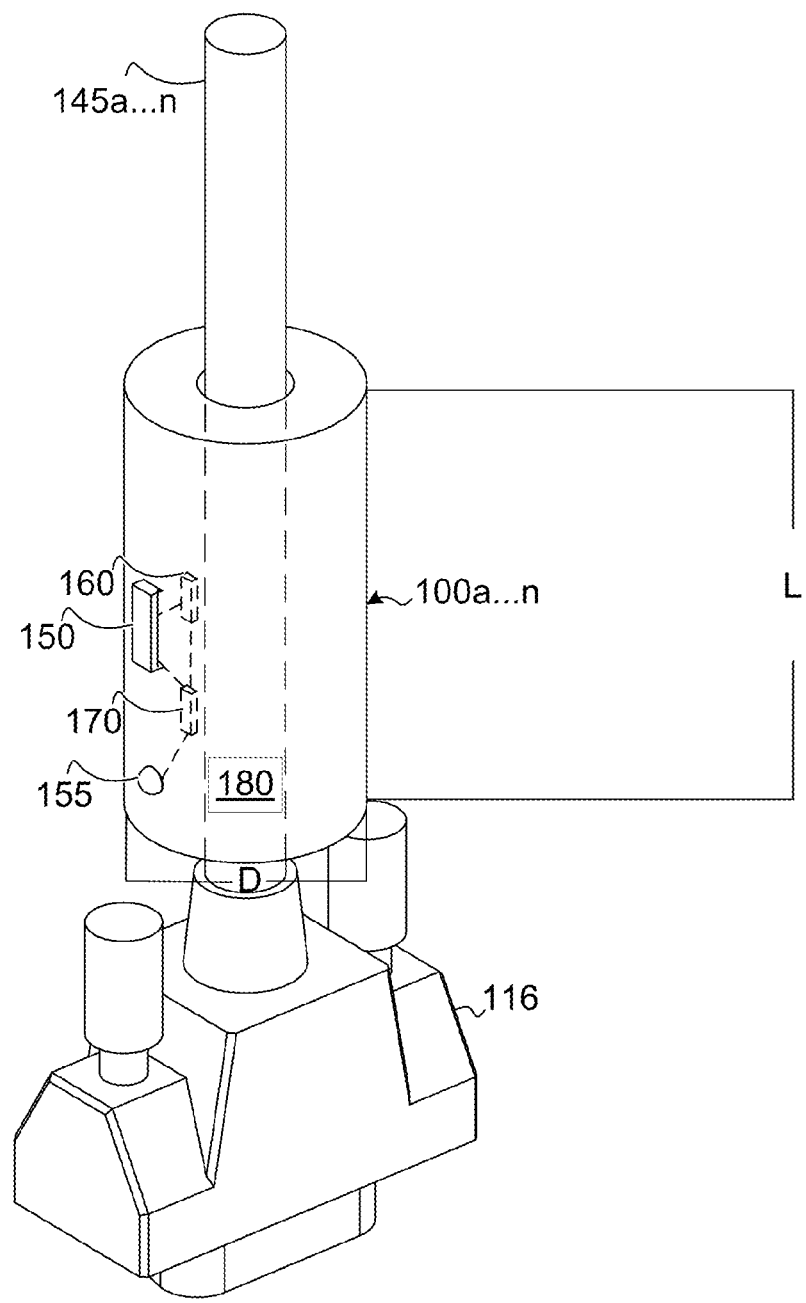

FIG. 6 illustrates an exterior view of the cable clamp-on device in accordance with an illustrative embodiment of the present invention.

Figure 7:
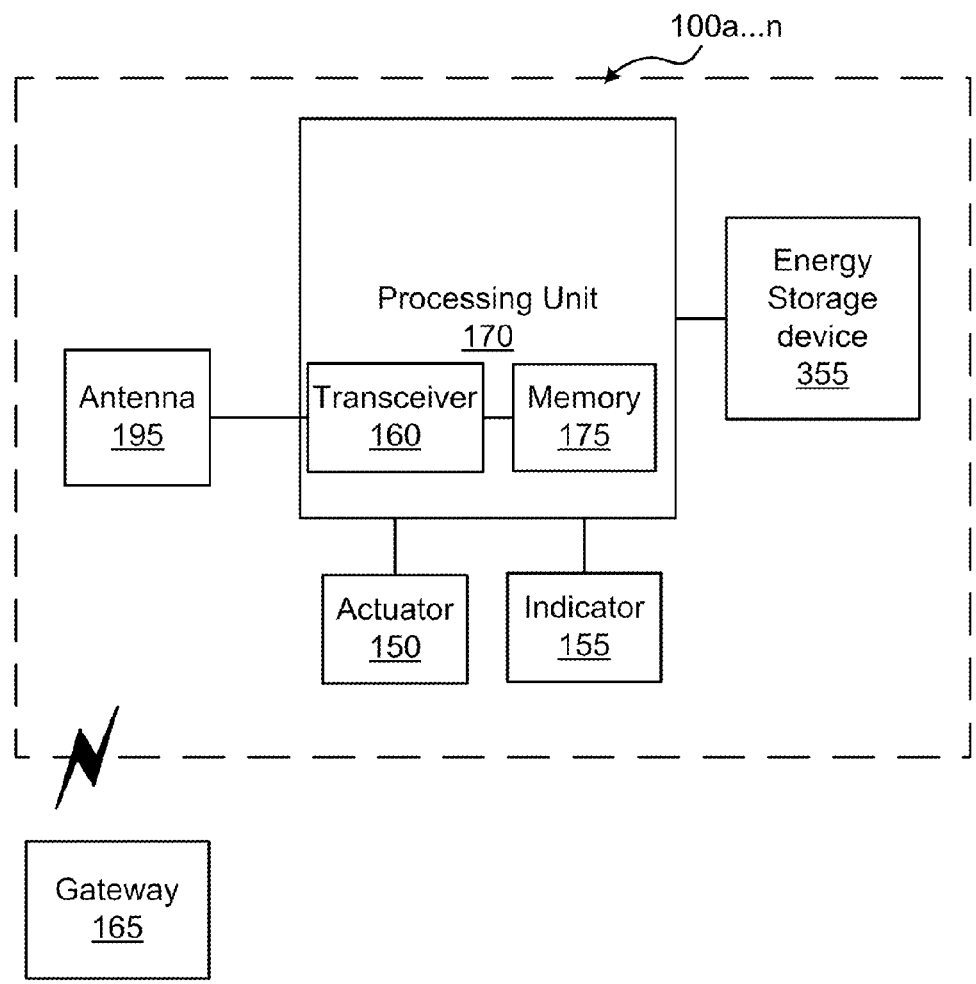

FIG. 7 illustrates an electrical block diagram of the cable clamp-on device in accordance with an illustrative embodiment of the present invention.

Figure 8:
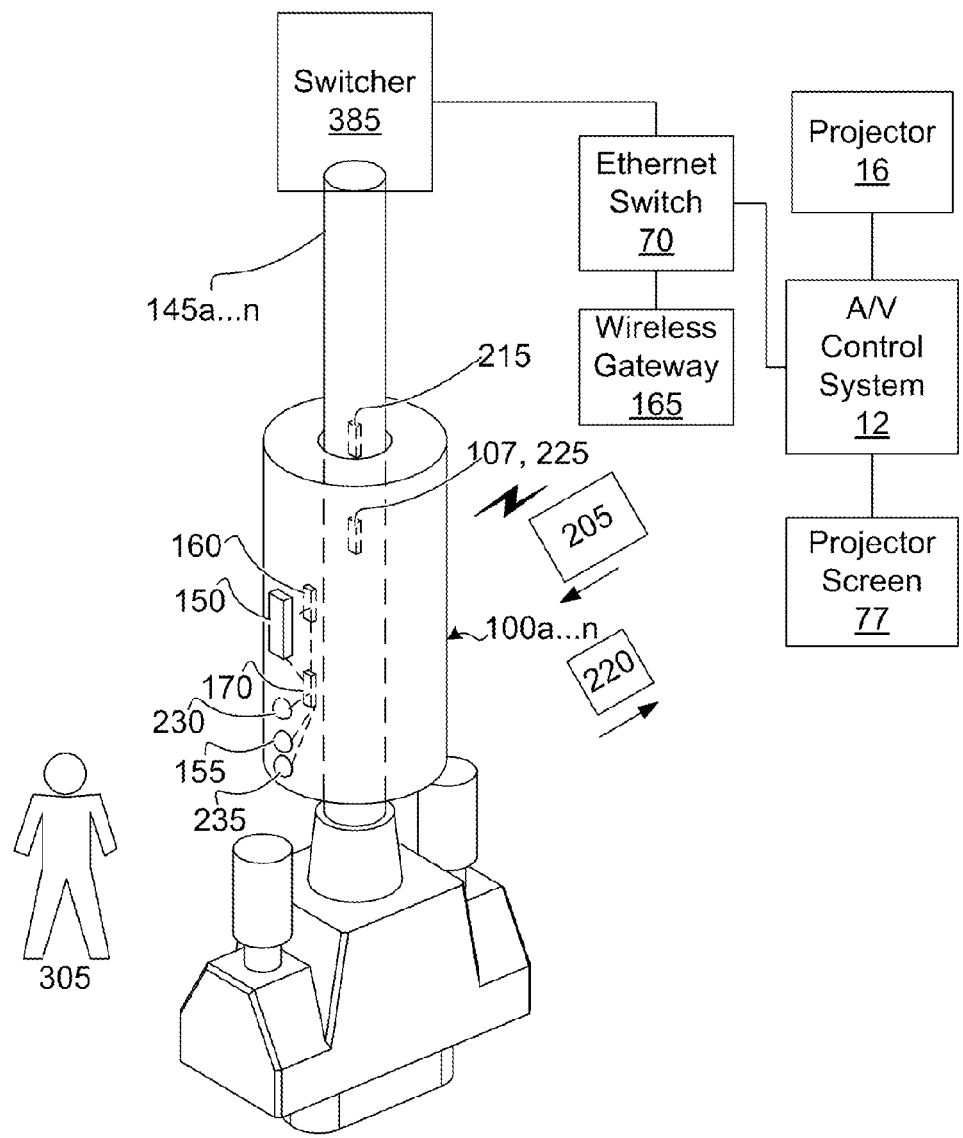

FIG. 8 illustrates the cable clamp in communication with a gateway in accordance with an illustrative embodiment of the present invention.

Figure 9:
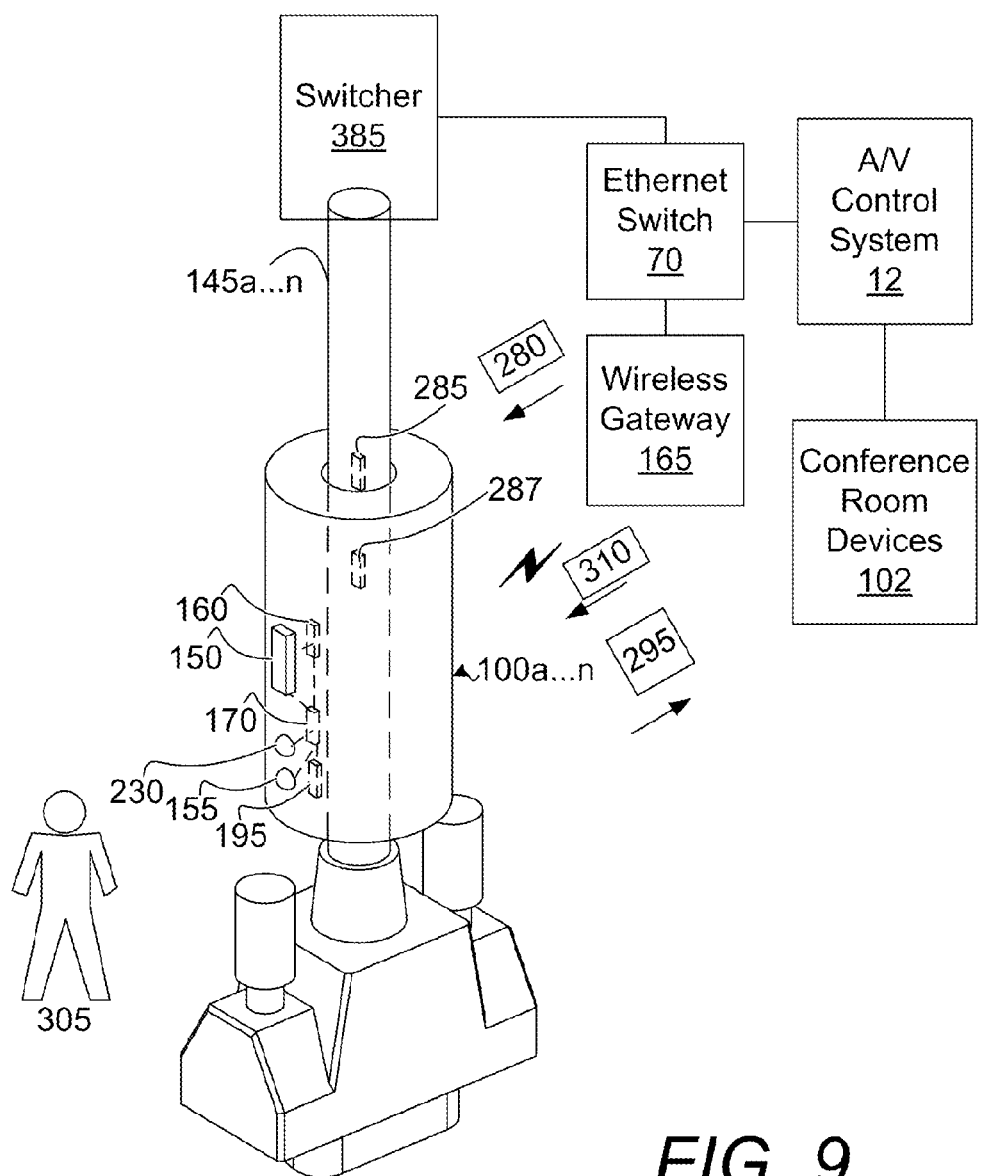

FIG. 9 illustrates the cable clamp-on device in communication with the gateway in accordance with another illustrative embodiment of the present invention.

Figure 10:
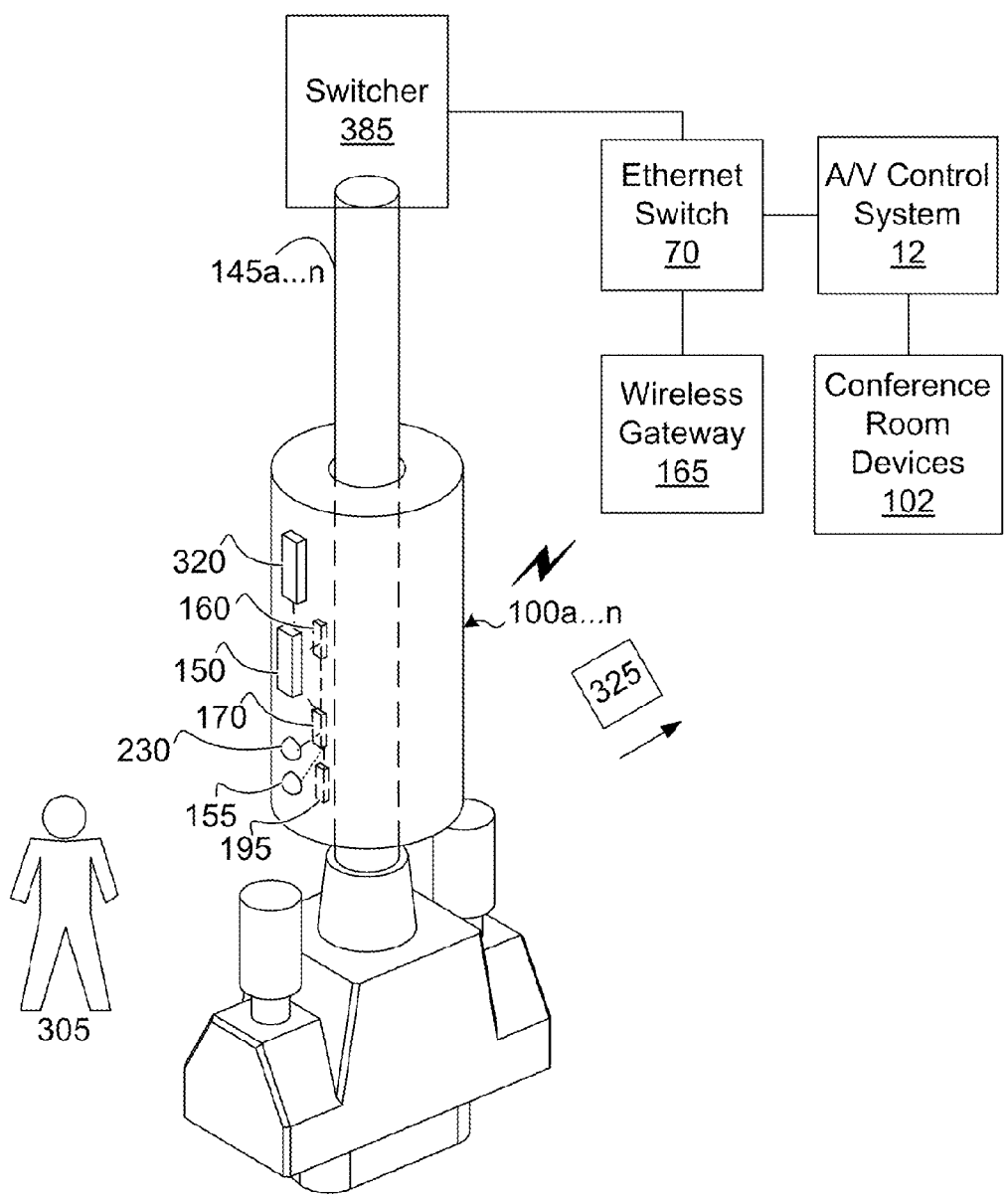

FIG. 10 illustrates the cable clamp-on device in communication with the gateway in accordance with yet another illustrative embodiment of the present invention.

Figure 11:
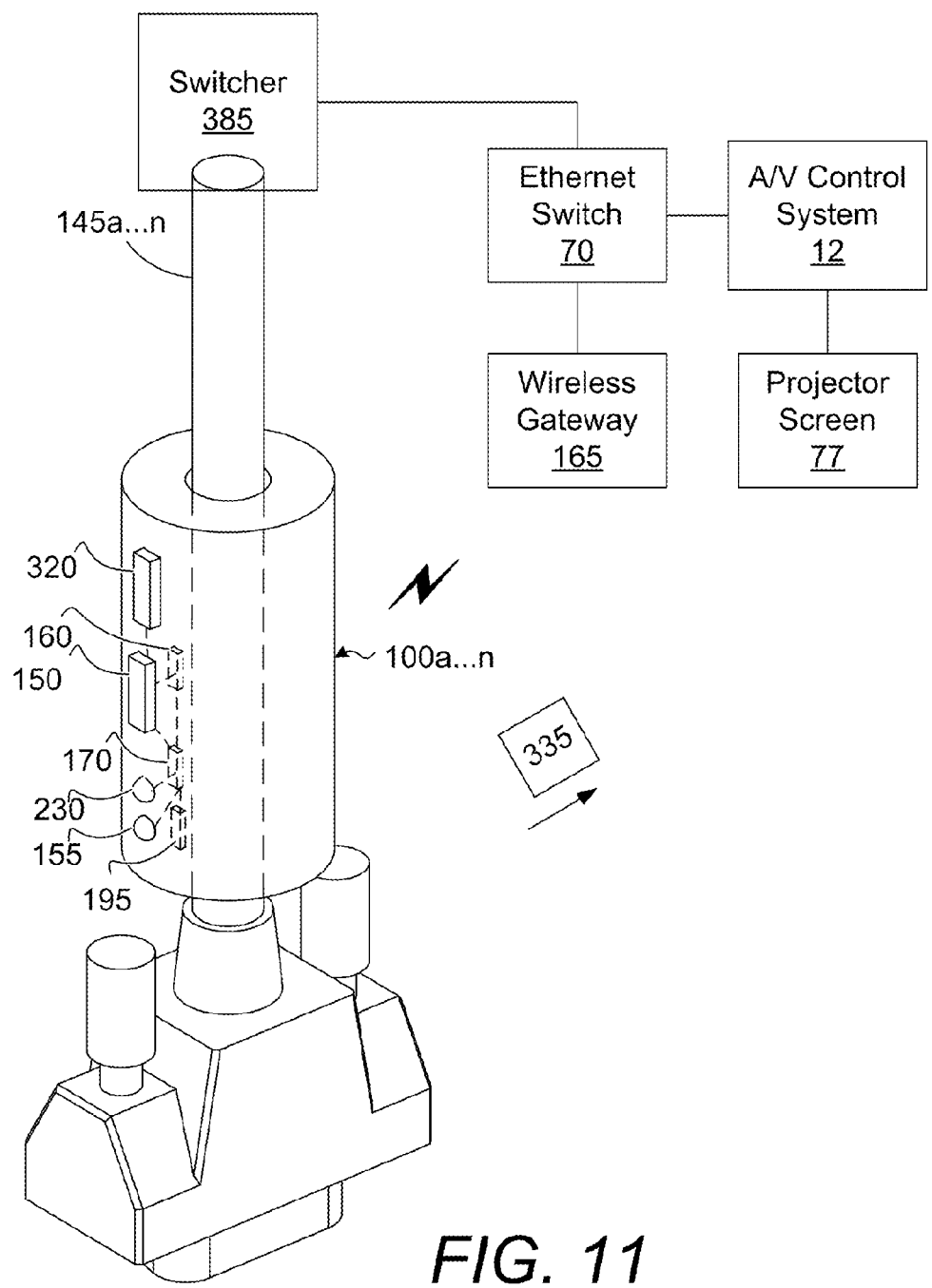

FIG. 11 illustrates the cable clamp-on device in communication with a gateway in accordance with yet another illustrative embodiment of the present invention.

Figure 12:
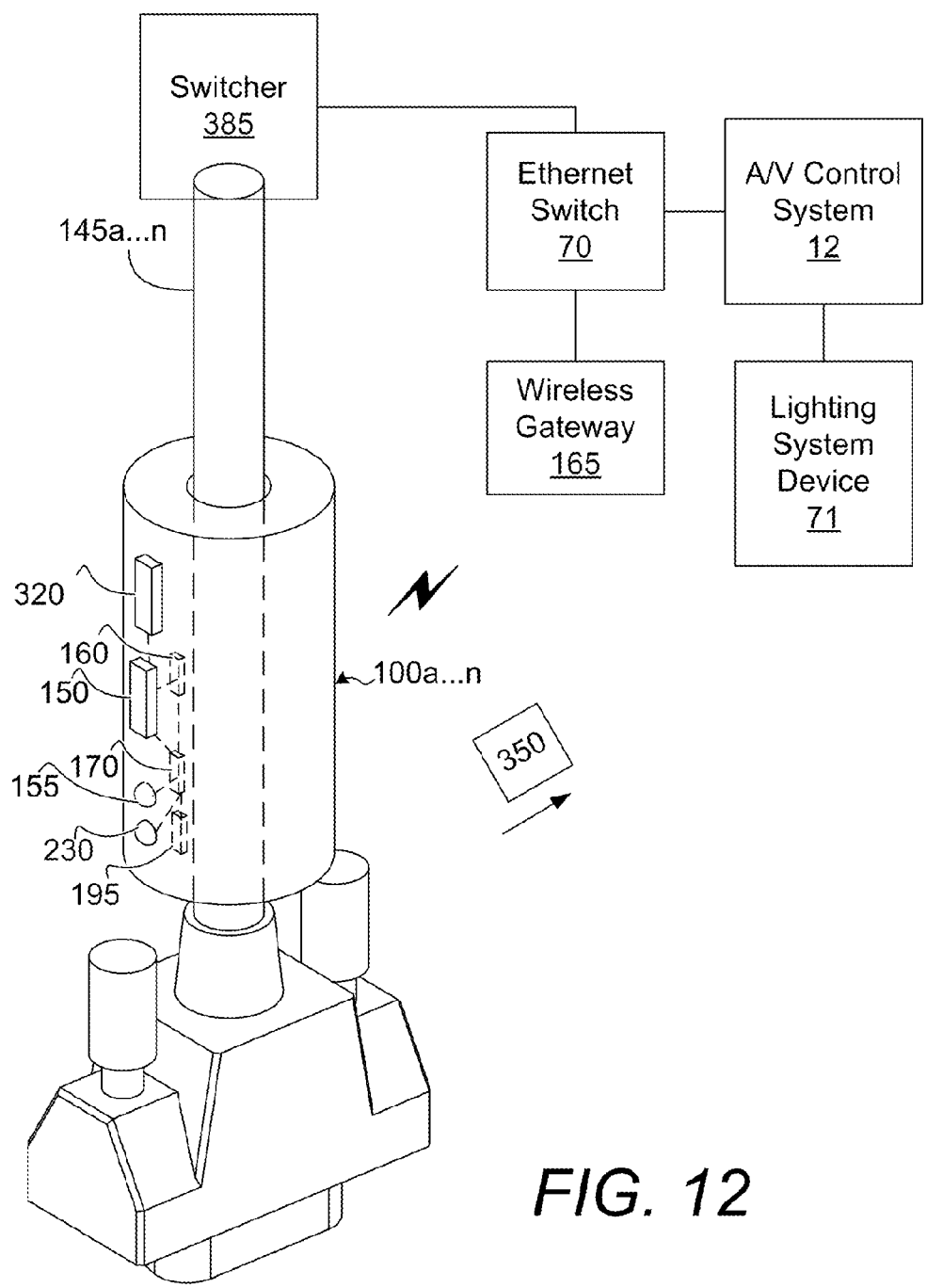

FIG. 12 illustrates the cable clamp-on device in communication with a gateway in accordance with yet another illustrative embodiment of the present invention.

Figure 13:
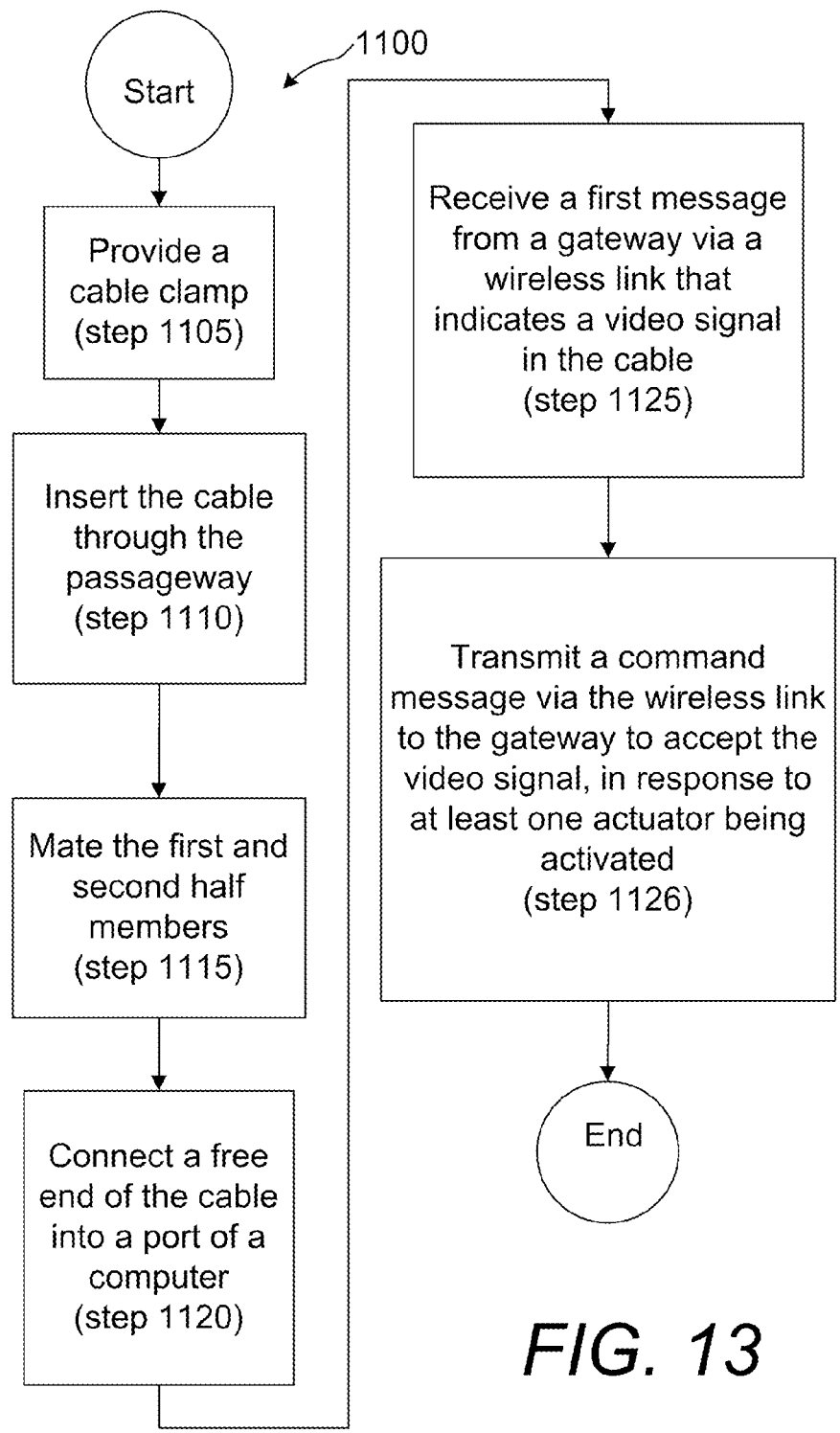

FIG. 13 illustrates a flowchart showing steps in accordance with an illustrative method of the present invention.

Figure 14:
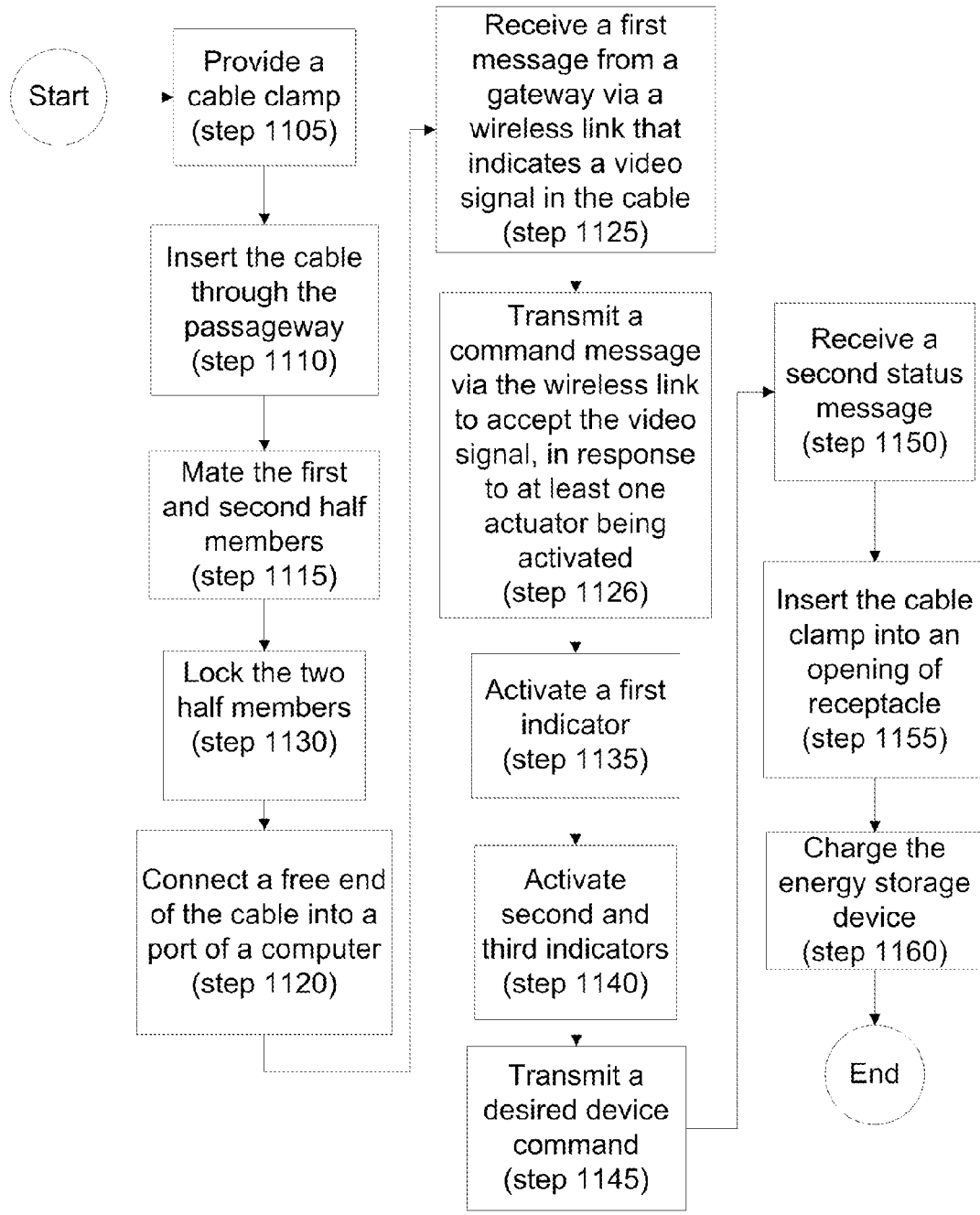

FIG. 14 illustrates a flowchart showing steps in accordance with another illustrative method of the present invention.

Figure 15:
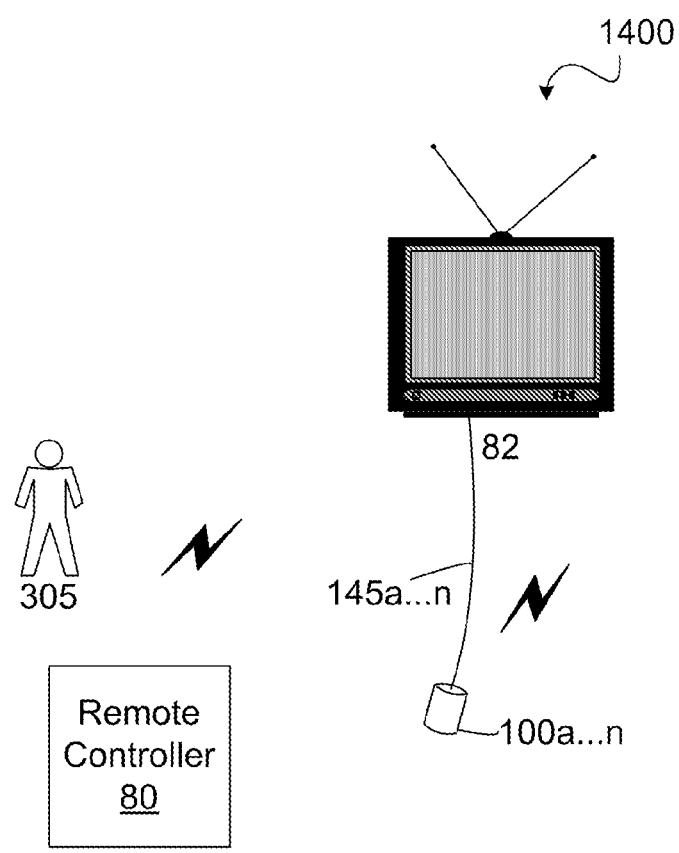

FIG. 15 illustrates a residential television environment that further includes an inventive cable clamp-on device in accordance with an illustrative embodiment of the present invention.

Figure 16:
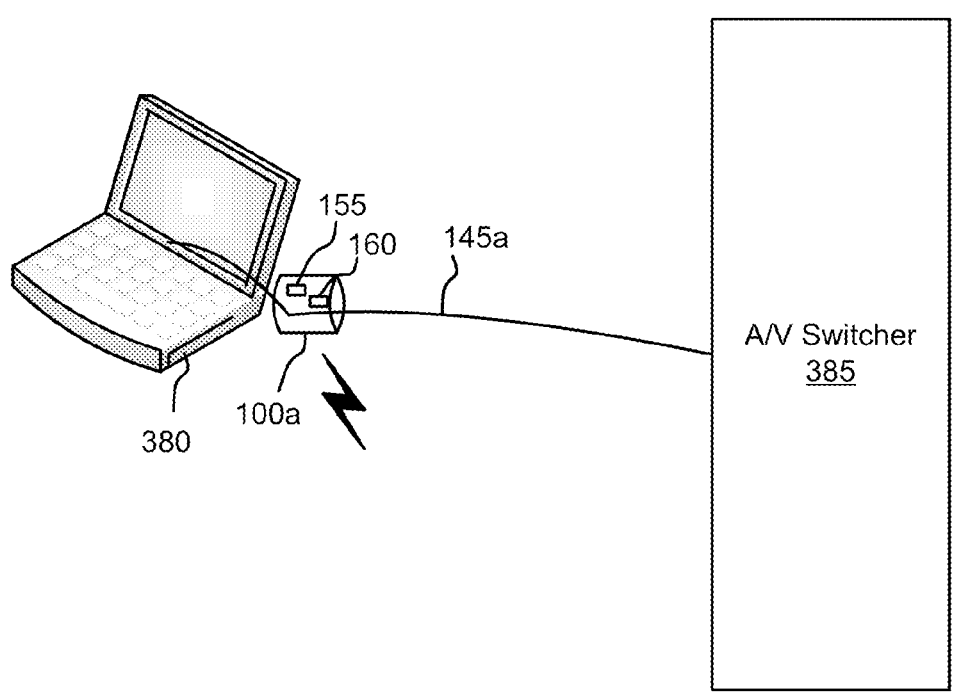

FIG. 16 illustrates a system in accordance with an illustrative embodiment of the present invention.

Figure 17:
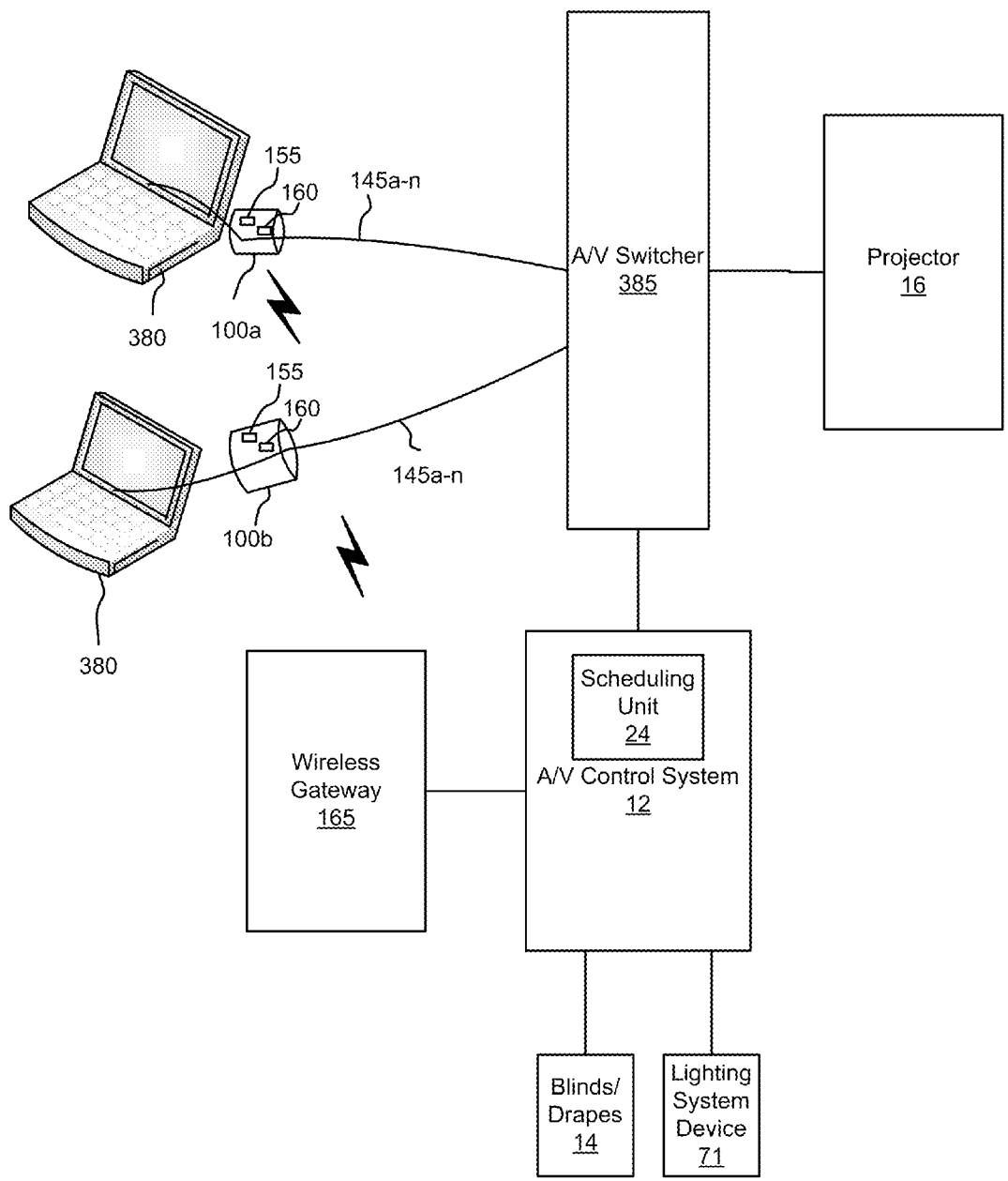

FIG. 17 illustrates another system in accordance with an illustrative embodiment of the present invention.

Figure 18:
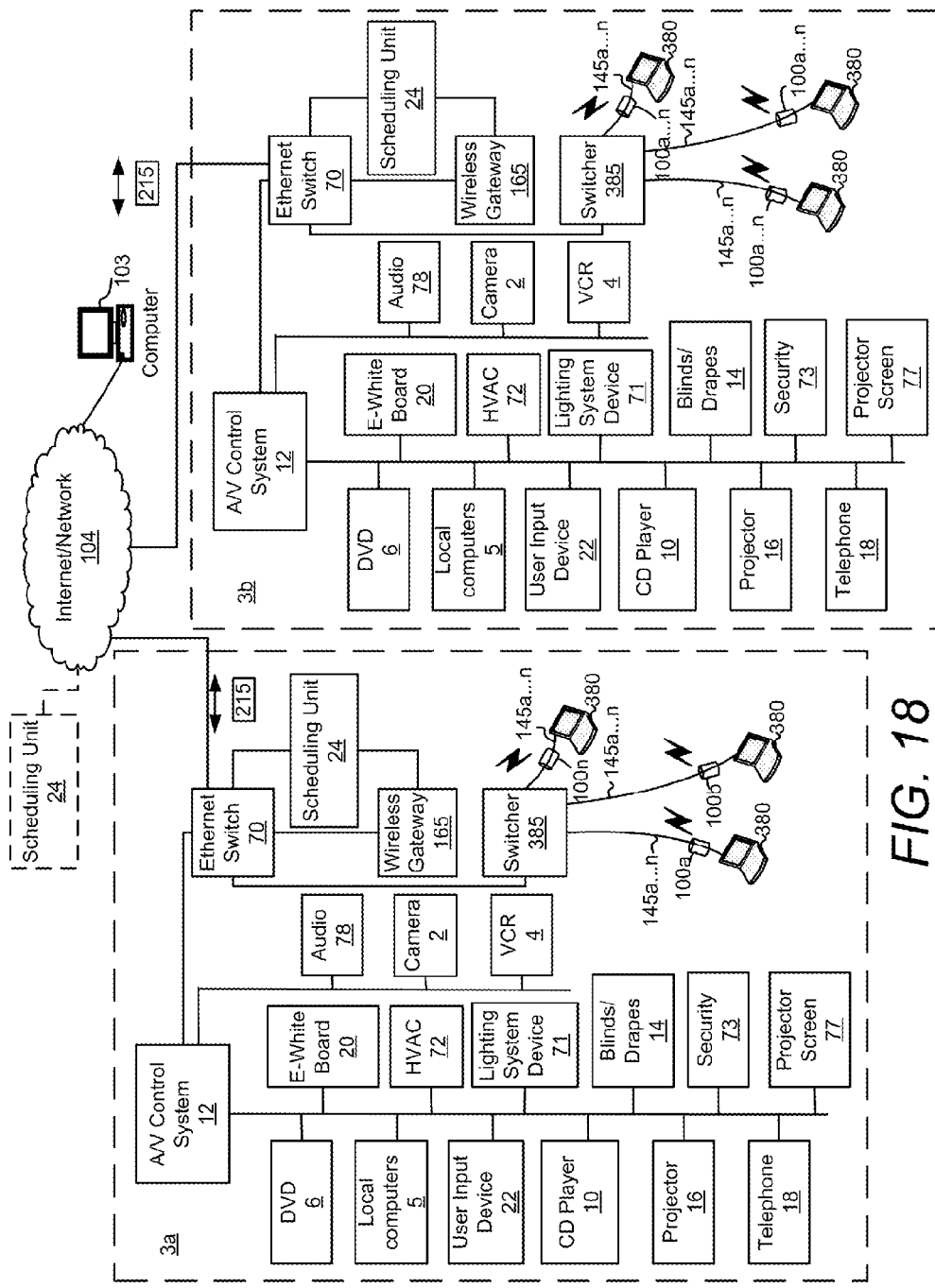

FIG. 18 illustrates multiple conference rooms with conference room devices in accordance with an illustrative embodiment of the present invention.

FIG. 19 illustrates a representative priority account screen with priority level and status indicators in accordance with an illustrative embodiment of the present invention.

FIG. 20 illustrates another representative priority account screen with priority level and status indicators in accordance with an illustrative embodiment of the present invention.

Figure 21:
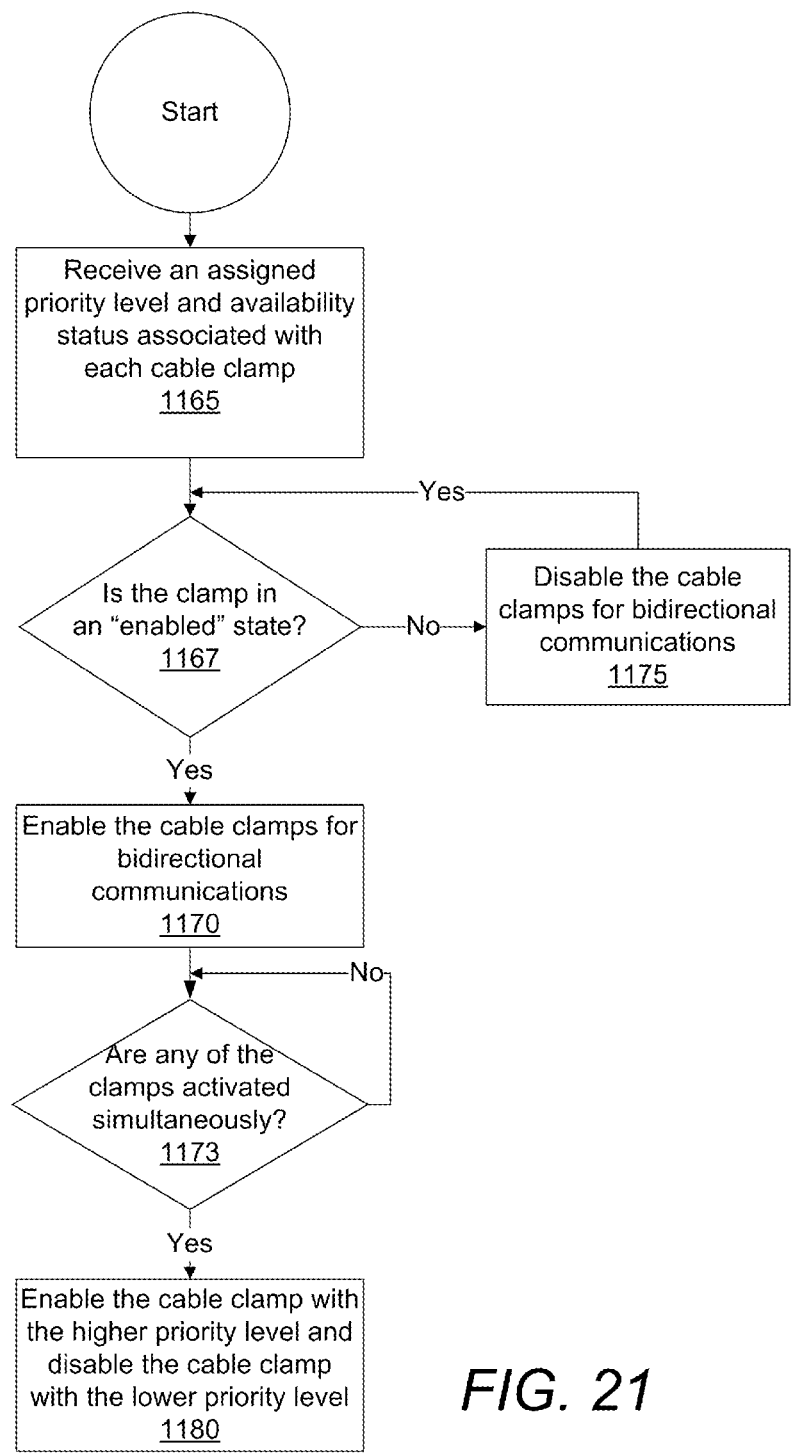

FIG. 21 is a flowchart showing a method for controlling a plurality of conference room devices in accordance with an illustrative embodiment of the present invention.

Figure 22:
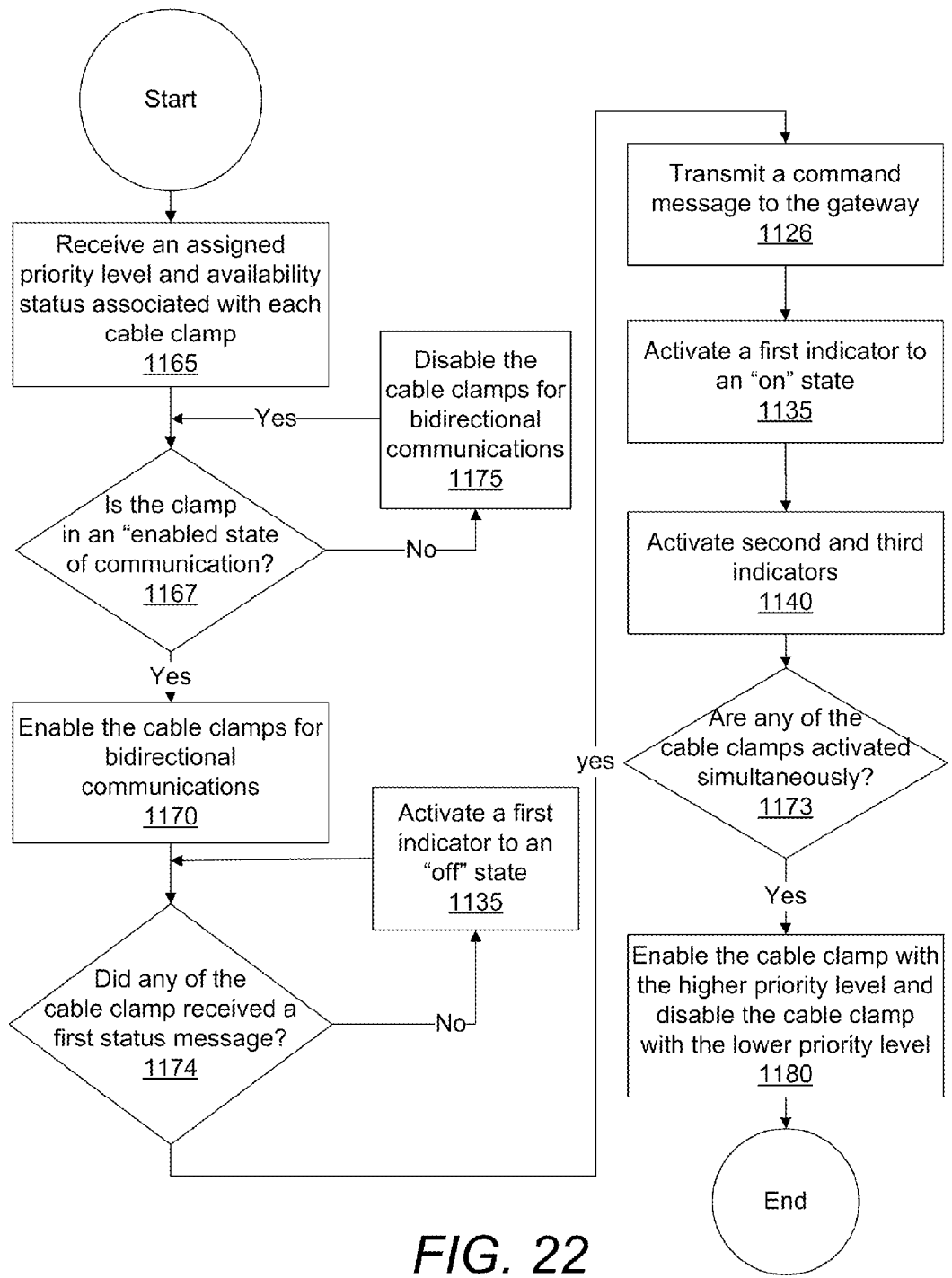

FIG. 22 is another flowchart showing a method for controlling conference room devices located in multiple teleconferencing sites in accordance with an illustrative embodiment of the present invention. In step 1165

Figure 23:
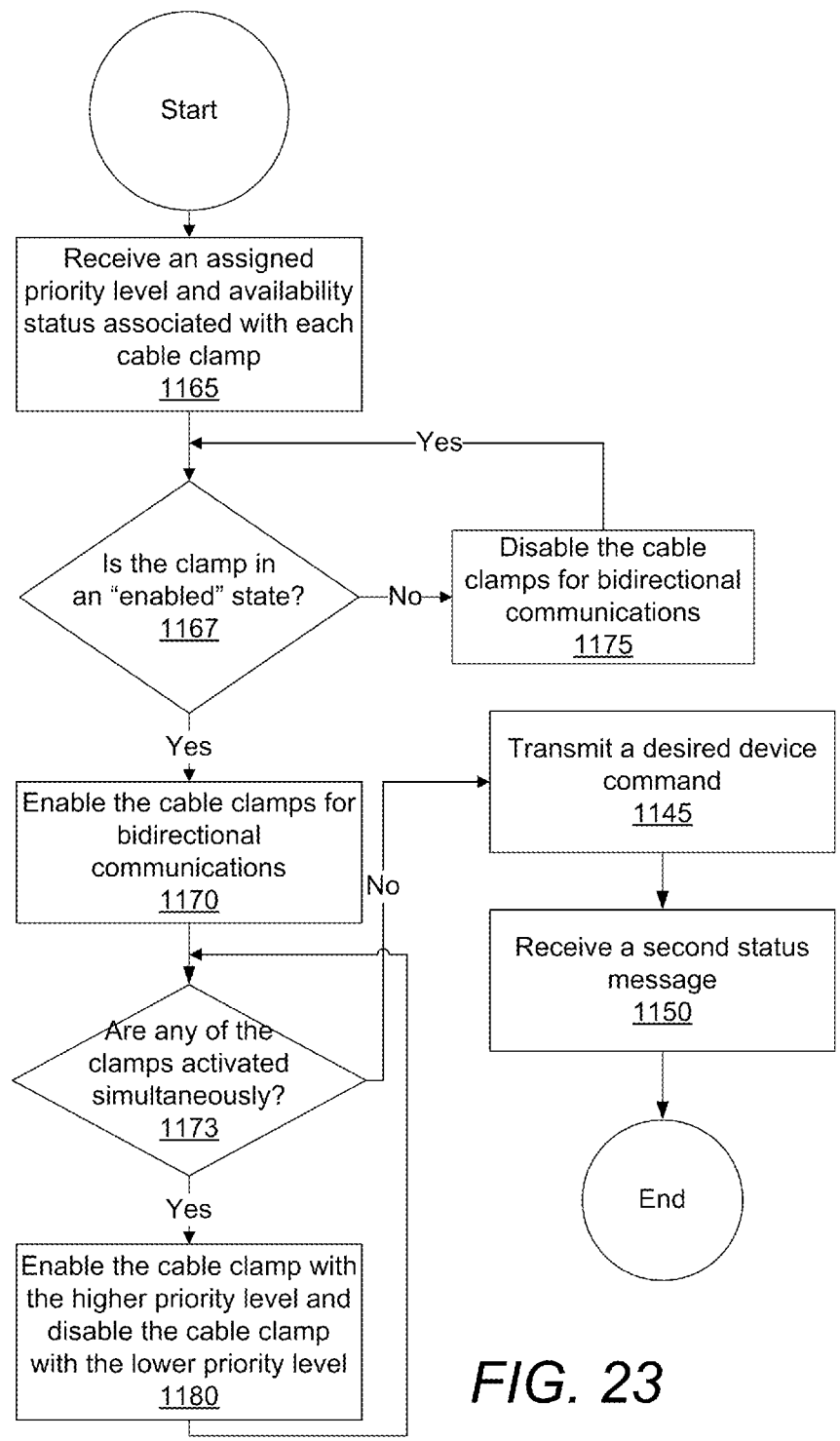

FIG. 23 is yet another flowchart showing a method for controlling a plurality of conference room devices in accordance with an illustrative embodiment of the present invention.

LIST OF REFERENCE NUMBERS FOR THE MAJOR ELEMENTS IN THE DRAWING

The following is a list of the major elements in the drawings in numerical order.

2 Cameras
3a-n Teleconferencing sites
4 Videocassette recorder
5 Local computers
6 Digital video disc
8 Priority level
10 Compact disc player
12 Audio visual control device
14 Blinds/drapes
16 Projector
18 Telephone
20 Electronic white board
22 User input device
24 Scheduling unit
26 User interface
28 Priority account
30 Entry in the priority account
32 Availability status indicator
34 Another entry in the priority account
70 Ethernet switch
71 Lighting system
72 Heating, ventilating, and air conditioning device
73 Security devices
77 Projector screen
78 Audio speakers
80 Television
82 Remote controller
100a-n Cable clamp user interface
101 Conference room/meeting room
101a-n Conference room/meeting room
102 Conference room devices
103 Master computer
104 Computer network
105 Body member
107 External video signal
110 First half member
115 Second half member
116 Connector
120 First mating surface
125 Second mating surface
130 Interior surface
135 Exterior surface
140 Passageway
145a-n Cable
150 At least one actuator
155 At least one indicator
160 Transceiver
165 Wireless gateway
170 Processing unit
175 Memory device
180 Locking mechanism
185 At least one tab
190 At least one slot
195 Antenna
200 System for connecting a computer to an integrated AV presentation system
205 First status message that indicates that an audio/video signal
215 Audio/video signal
220 Command message to accept the audio/video signal
225 Informational data being transmitted by the computer in the cable
230 Second indicator
245 Top portion (of body member)
250 Bottom portion (of body member)
255 Receptacle
260 Cable storage compartment
262a-n Cables
265 Cable retractor
270 At least one charging output contact
275 At least one charging input contact
280 First status message that indicates a signal source
285 Signal source that is associated with one of the at least one conference room devices
287 Desired device signal that is associated with one of the at least one conference room devices
295 Desired device command
305 User
310 Second status message
320 Second actuator
325 Power message
335 Control message
345 Dimmer
350 Dimmer message
355 Energy storage device
360 Contactless charging circuit
365 Power cord
370 First end (of the cable)
375 Second end (of the cable)
380 Computers/portable device
385 Audio/Video switcher
1100 Flowchart for communicating command/status information with a computer
1105 Step of providing a cable clamp
1110 Step of inserting the cable through the passageway
1115 Step of mating the first and second half members
1120 Step of connecting a free end of the cable into a port of a computer 1125 Step of receiving a first status message
1126 Step of transmitting a command message
1130 Step of locking the two half members
1135 Step of activating a first indicator
1140 Step of activating a second indicator
1145 Step of transmitting a desired device command
1150 Step of receiving a second status message
1155 Step of inserting the cable clamp into an opening of receptacle
1160 Step of charging the energy storage device
1400 Schematic of a residential television environment
1165 Receiving an assigned priority level
1167 Is the cable clamp in an "enabled state of communication?
1170 Enabling the cable clamps
1173 Are any of the cable clamps activated simultaneously?
1175 Disabling the cable clamps
1174 Did any of the cable clamps receive a first status message?
1180 Temporarily enabling the cable clamp

DETAILED DESCRIPTION OF THE INVENTION

Mode(s) for Carrying Out the Invention

The present invention relates to a cable clamp-on device for coupling audio/visual devices to a network. More particularly, the invention relates to a cable clamp-on device for communicating audiovisual information to a display system via a wireless communication link in a bidirectional manner.

FIG. 1 is a block diagram illustrating a conference room 101. The conference room 101 includes a plurality of conference room devices 102, which may be remotely controllable using an A/V control system 12. A computer 380 connected via a cable 145a-n is preferably located within a meeting or conference room 101 to facilitate connection to various conference room devices 102 and/or be an audio/video source. The computer 380 may be a laptop computer. In one embodiment, the computer 380 is directly connected to an audio/video switcher 385 via the cable 145a-n. The audio/video switcher 385 may be a Digital Media Switcher with interface cards that is available from Crestron Electronics, Inc. of Rockleigh, N.J. The audi/video switcher 385, in turn, is connected to an Ethernet switch 70, which in turn, is connected to an AV control system 12. The AV control system 12 is connected to various conference room devices 102 via a wired or wireless connection.

The conference room devices 102 include various types of audio/visual equipment in addition to devices used to control the ambient conditions of the meeting or conference room 101. For example, audio/visual equipment includes, but is not limited to, cameras 2, VCR 4, DVD 6, projector 16, CD player 10, one or more local computers 5, AV control device 12, DVR (not shown), cable television box (not shown), and television (not shown) such as plasma, liquid crystal display, light-emitting diode flat panel, and cathode ray tube television. The AV control device 12 may be a Crestron 2-Series Control system available from Crestron Electronics, Inc. of Rockleigh, N.J. The Crestron 2-Series Control system provides a complete integrated AV or automation solution. Every audio, video, and environmental element of the conference room 101 becomes integrated and accessible through the AV control device 12.

Conference room devices 102 used to control the ambient conditions of the conference or meeting room 101 includes access control devices such as security devices 73 (e.g., door locks), lighting system device 71, a projector screen 77, audio speakers 78, window coverings such as blinds/drapes 14, a telephone 18, a Heating, Ventilating, and Air Conditioning (HVAC) system device 72, and an electronic white board 20.

The Ethernet switch 70 is connected to a wireless gateway 165. The wireless gateway 165 may be a wireless Wi-Fi gateway and/or a wireless Zigbee gateway. The wireless Wi-Fi gateway and wireless Zigbee gateway may be combined into a single wireless gateway device 165.

Local control of the conference room devices 102 is provided via a set of menus that form a graphical user interface (GUI) displayed on a menu display and user input device 22, which may be a touch panel or similar system. The touch panel may be used to display a user interface with intuitive controls to control some or all of the functions of connected conference room devices 102. Alternatively, or in combination, remote control of one or more conference room devices 102 may be provided by a master computer 103 that can be remotely located and can communicate with the Ethernet switch 70 via a computer network 104. In one embodiment, computer network 104 may include any of a number of local and wide area networks including the Internet.

A system 200 is another example to control the conference room devices 102. More specifically, FIG. 2 illustrates the system 200 for connecting a portable audio visual device to an integrated AV presentation system. The system 200 comprises a cable clamp user interface 100a-n for bidirectional communications with at least one conference room device 102. Referring to FIGS. 4 and 5, the cable clamp 100a-n comprises top and bottom portions 245, 250; and first and second half members 110, 115. The first and second half members 110, 115 may be cylindrically shaped. Each of the first and second half members 110, 115 includes first and second mating surfaces 120, 125, and interior and exterior surfaces 130, 135. The first and second half members 110, 115 are connected at the first mating surfaces 120 thereof such that the first and second half members 110, 115 form a passageway 140 for receiving a cable 145a-n (see FIG. 6) therethrough. The first and second half members 110, 115 may be hinged at the first mating surfaces 120 to form the passageway 140.

The cable clamp 100a-n further includes at least one actuator 150, at least one indicator 155, and a transceiver 160. The at least one actuator 150 and at least one indicator 155 are disposed on one of the exterior surfaces 135. The transceiver 160 transmits data including data regarding the at least one actuator 150 and receives data including data regarding the at least one indicator 155 via the wireless link. The cable clamp 100a-n further includes a processing unit 170. The processing unit 170 is connected to the at least one actuator 150, the at least one indicator 155, and the transceiver 160. The processing unit 170 is located within one of the first and second half members 110, 115. The transceiver 160 may be an infrared or ultrasonic transceiver.

Referring back to FIG. 2, the system 200 further includes a receptacle 255 located within a cable storage compartment 260 for storing and recharging the cable clamp 100a-n. The user 305 is able store the cable clamp 100a-n by inserting the cable clamp 100a-n into the receptacle 255. The receptacle 255 may include magnets, keying shape or clips to position the cable clamp 100a-n into the receptacle 255.

The storage compartment 260 can be a flip top to provide control and connectivity solution. The flip top is flush mounted onto a tabletop. When the lid of the flip top opens, a color touch panel and key pad are exposed. The flip top includes a cable storage compartment to keep interface cables 145a-n, 262a-n readily available for plugging in computers, AV sources, and a host of other conference room devices 102. Attached to the storage compartment 260 is the receptacle 255. The receptacle 255 is mechanically and electrically connectable and disconnectable from the bottom portion 250 of the cable clamp 100*a-n*.

Referring to FIG. 3, the receptacle 255 recharges the energy storage device 355 that is in the cable clamp 100*a-n*. The receptacle 255 includes at least one charging output contact 270 that is located, for example, on the cavity surface. The cable clamp 100*a-n* includes at least one charging input contact 275 that is located on one of the exterior surfaces 135 of the first and second half members 110, 115. When the receptacle 255 receives the cable clamp 100*a-n*, the at least one charging output contact 270 is in electrical contact with the at least one charging input contact 275 because the output contact 270 mates with the input contact 275. The at least one charging output contact 270 is electrically connected to a power cord 365. It should be understood that other charging methods can be implemented besides having input and output contacts 275, 270 in electrical contact. For example, the receptacle 255 can be a contactless charging station that avoids contact failure between input and output contacts 275, 270. The receptacle 255 includes a contactless charging circuit 360 to charge the energy storage device 355.

The system 200 further includes a cable retractor 265 for retracting and storing a length of the cable 145*a-n*. Cables 145*a-n*, 262*a*-262*n* are often longer than required in the particular environment in which the conference room devices 102 are used. As a result, the excess length of the cable 145*a-n*, 262*a*-262*n* hangs in the storage compartment and/or is underneath the table, and is liable to get caught on objects. To avoid such a problem, the cable retractor 265 includes a mechanism for releasably retracting and storing a length of the cable 145*a-n*. The retractor 265 may be located underneath the table and adjacent to the storage compartment such that the retractor 265 is not in plain view of the user 305. The cable 145*a-n* has first and second ends 370, 375. The first end 370 is connected to the computer 380 and the second end 375 is connected to one of the conference room devices 102 such as an audio/video switcher 385. The cable length is wound up in the cable retractor 265.

FIGS. 4 and 5 are schematic diagrams illustrating interior views of the cable clamp user interface 100*a-n*. FIG. 6 is a schematic diagram illustrating an exterior view of the cable clamp user interface 100*a-n*. The cable clamp 100*a-n* communicates audiovisual information to, for example, the computer 380 via a wireless communication link in a bidirectional manner.

Referring to FIGS. 4-6, the cable clamp 100*a-n* includes a first half member 110 and a second half member 115. Each of the first and second half members includes first and second mating surfaces 120, 125, and interior and exterior surfaces 130, 135. The first and second half members 110, 115 are connected at the first mating surfaces 120 thereof such that the first and second half members 120, 125 form a passageway 140 for receiving the cable 145*a-n* therethrough. The cable clamp 100*a-n* further includes at least one actuator 150 disposed on one of the exterior surfaces 135, at least one indicator 155 disposed on one of the exterior surfaces 135, a transceiver 160 to transmit data regarding the at least one actuator 150 and to receive data regarding the at least one indicator 155 (via a wireless link), and a processing unit 170. The processing unit 170 is connected to the at least one actuator 150, the at least one indicator 155, and the transceiver 160. The processing unit 170 is located within one of the first and second half members 120, 125. When a user 305 activates the at least one actuator 150, one of the conference room devices 102 can be controlled remotely.

In one embodiment, the wireless link includes, but is not limited to, a Wi-Fi link, Bluetooth link, Zigbee/IEEE 802.15.4 link, proprietary UHF data link, and cellular link. Advantages of the Zigbee/IEEE 802.15.4 link includes encryption, repeating mesh technology, and low power consumption. A single chip device that includes a microprocessor, power supply, and RF transceiver allows a Zigbee implementation to be small. It should be understood that other wireless link can be used for wireless communication.

The cable clamp 100*a-n* includes a locking mechanism 180 disposed on the two half members 110, 115 to maintain closure. With the two half members 110, 115 being in a locked position, the cable clamp 100*a-n* is able to slide freely with respective to the cable 145*a-n*. In one embodiment, the locking mechanism 180 includes a rubber band (not shown) and a screw and a nut (not shown). The rubber band may be wrapped around the two half members 110, 115 to keep the two half members 110, 115 in a closed position. Alternatively, a screw and nut can be used to lock the two half members 110, 115 together.

In another embodiment, the locking mechanism 180 includes at least one tab 185 formed on the second mating surface 125 of the first half member 110 and At Least One Slot 190 Formed on the Second Mating Surface 125 of the Second Half member 115. The at least one tab 185 engages the at least one slot 190 to maintain the two half members 110, 115 in a locked position.

With the two half members 110, 115 being in a closed or locked position, the cable clamp 100*a-n* is able to slide freely relative to the cable 145*a-n* until the cable clamp 100*a-n* makes contact with a connector 116, which is attached to one end of the cable 145*a-n*. The length of the connector 116 is larger than the diameter of the passageway 140 to prevent the cable clamp 100*a-n* from sliding off the cable 145*a-n*. The diameter of the passageway (labeled as "D") is between 0.1 inches to 1.5 inches. The two half members 110, 115 have a length (labeled as "L") between 0.9 inches to 1.7 inches.

The two half members 110, 115 are made of a polymeric material that includes, but is not limited to, polypropylene, polystyrene, polyester, polyvinyl chloride, polyethylene, polycarbonate, and polyurethane. The two half members 110, 115 may also be made of a non-polymeric material such as mica, ceramics, various glasses, quartz, and wood.

The cable 145*a-n* for communicating between the computer 380 and audio/video switcher 385 includes a VGA cable, DVI cable, HDMI cable, Display Port cable, CAT-5, CAT-6, optical fiber, USB cable, analog or any type of audio or video cable.

The at least one actuator 150 includes, but is not limited to, a pushbutton, dial button, toggle button, slide button, rocker button, touch switch, and proximity switch. The at least one actuator 150 may also be a touch screen element.

FIG. 7 is an electrical block diagram of the cable clamp 100*a-n*. The cable clamp includes a processing unit 170. The processing unit 170 includes the transceiver 160 for transmitting and receiving data in a bidirectional manner (or 2-way communication) with the wireless gateway 165. The wireless gateway 165 may be a 2-way Radio Frequency (RF) gateway/transceiver designed to enable communications and management for wireless network of conference room devices 102 such as dimmers 345 and thermostats (not shown). The wireless gateway 165 links the network to an Ethernet switch 70 (see FIG. 1) via high-speed Ethernet or "Wi-Fi friendly" RF technology that permits selection from 16 Industrial, Scientific and Medical (ISM) channels within the 2.4 GHz spectrum to minimize the possibility of interference with other RF equipment including 802.11 devices. Moreover, by operating in the 2.4 GHz spectrum, an antenna 195 can be a small chip antenna that fits easily in the cable clamp 100a-n. The gateway 165, for example, may be a CEN-RFGW-EX infiNET EX Wireless Gateway that is available from Crestron Electronics, Inc. of Rockleigh, N.J.

The processing unit 170 further includes a memory device. The memory device 175 stores data such as data regarding the actuator 150 and indicator 155. The memory device 175, for example, is a Random-access Memory (RAM), Read-only Memory (ROM), Electrically Erasable Programmable Read-Only Memory (EEPROM), or disk. The processing unit 170 is connected to an energy storage device 355. The energy storage device 355 supplies electrical power. The energy storage device 355 is a battery that may be, but is not limited to, a coin cell battery, lithium polymer battery, nickel-cadmium battery, and alkaline battery.

The processing unit 170 is connected to an antenna 195, the at least one actuator 150, and the at least one indicator 155. The antenna 195 communicates with the conference room devices 102 via the wireless gateway 165. The at least one indicator 155 includes, but is not limited to, a Light-Emitting Diode (LED), a Liquid Crystal Display (LCD), an Organic Light Emitting Diode (OLED) dot matrix display, a transflective e-paper.

A variety of interface behaviors between the cable clamp 100a-n and the conference room devices 102 will be described. Referring to FIG. 8, in one embodiment, the cable clamp 100a-n communicates wirelessly in a bidirectional manner with the wireless gateway 165, which in turn, communicates with the Ethernet switch 70. The Ethernet switch 70 is connected to the AV control system 12. The AV control system 12, in turn, is connected to the conference room devices 102, for example, a projector 16 and a projector screen 77. An audio/video signal 215 is initially available in the cable 145a-n. The transceiver 160 initially receives a first status message 205 via the wireless link from the gateway 165 that indicates the audio/video signal 215 is in the cable 145a-n. In response to the transceiver 160 receiving the first status message 205, the first indicator 155 switches to an "on" state to indicate reception of the first status message 205. If the transceiver 160 did not receive the first status message 205, the first indicator 155 would be in the "off" state to indicate non-reception of the first status message 205. A user 305 is able to obtain visual feedback as to whether the audio/video signal 215 is readily available in the cable 145a-n by looking at the first indicator 155.

If the audio/video signal 215 is available (as displayed by the first indicator 155), the user 305 actuates the at least one actuator 150 to accept the audio/video signal 215 that is currently available in the cable 145a-n. In response to the actuation, the transceiver 160 transmits a command message 220 to accept the audio/video signal 215 via the wireless link to the gateway 165, which in turn, is connected to the Ethernet switch 70. The Ethernet switch 70, in turn, is connected to the AV control system 12. The AV control system 12 communicates with the projector 16 to maintain the audio/video signal 215 in the cable 145a-n. The user 305 then plugs the cable 145a-n into the computer 380, for example, a laptop computer, knowing that the audio/video signal 215 is available in the cable 145a-n. The user 305 inputs a series of commands on the keyboard so that the computer 380 outputs an external video signal 107 to the projector 16. The external video signal 107 includes informational data 225 to be displayed on the projector screen 77. The informational data 225 is any data that the user 305 wants to display on the projector screen 77, for example, a video presentation.

The cable clamp 100a-n further includes second and third indicators 230, 235. The second and third indicators 230, 235 display at least five states differentiated by color. The first colored state is off when the cable clamp 100a-n is in a powered "off" state. The second colored state is activated when the cable clamp 100a-n is in a powered "on" state. The cable clamp 100a-n is powered on in response to the user 305 pressing one of the actuators 150. The third colored state is activated when the AV control system 12 makes the audio/video signal 215 available in the cable 145a-n and the wireless gateway 165 selects the audio/video signal 215. Once the user 305 sees that the third colored state is activated, the user 305 can press one of the actuators 150 to accept the audio/video signal 215. The fourth colored state is activated in response to the actuation by the user 305. The user 305 can easily see that the audio/video signal 215 is active and is accepted because the second and/or third indicators 230, 235 display the fourth colored state. The user 305 can then input keyboard sequence on the computer 380 to execute an output of the external video signal 107. The external video signal 107 includes informational data 225. The fifth colored state is activated in response to the informational data 225 being transmitted in the cable 145a-n. The user 305 can easily see that the computer 380 is outputting the external video signal 107 because the second and/or third indicators 230, 235 display the fifth colored state, which assists the user 305 to configure the computer 380 properly. It should be understood that any of the colored states when activated may blink on and off.

In another interface behavior, the signal in the cable 145a-n is not initially the audio/video signal 215 (as illustrated in FIG. 8) but rather is a signal associated with another conference room device 102 that is not the projector 16. In this embodiment, the user 305 may not know which of the conference room devices 102 is associated with the signal in the cable 145a-n. Referring to FIG. 9, the gateway 165 initially transmits to the transceiver 160 a first status message 280. The first status message 280 indicates which one of the conference room devices 102 has a signal source 285 that is currently in the cable 145a-n. The signal source 285 is associated with one of the conference room devices 102. In response to the transceiver 160 receiving the first status message 280, the first indicator 155 switches to an "on" state to indicate reception of the first status message 280. If the transceiver 160 did not receive the first status message 280, the first indicator 155 would be in the "off" state to indicate non-reception of the first status message 280.

The user 305 selects a desired device, which is one of the conference room devices 102, by actuating one of the actuators 150. In response to the actuation, the transceiver 160 transmits a desired device command 295 for a desired device signal 287 to be available in the cable 145a-n via the wireless link to the gateway 165. The gateway 165, in turn, communicates with the AV control system 12 via the Ethernet switch 70. The AV control system 12 is connected to the conference room devices 102. In response to the AV control system 12 receiving the desired device command 295, the AV control system 12 sends the desired device signal 287 in the cable 145a-n. The desired device signal 287 is associated with one of the conference room devices 102. The gateway 165 transmits to the transceiver 160 a second status message 310 that indicates that the desired device signal 287 is available in the cable 145a-n. The second and/or third indicators 230, 235 are activated in response to the transceiver 160 receiving the second status message 310. The user 305 may then plug the cable 145*a-n* into the computer 380 with the confidence that the desired device signal 287 is available in the cable 145*a-n*.

It should be understood that the actuator 150 may be a touch panel. The touch panel can display which one of the conference room devices 102 is active when the transceiver 160 receives the first status message 280. The touch panel includes a GUI interface and the user 305 can scroll through various menus on the touch panel to select the user desired device, which is one of the conference room devices 102.

FIGS. 10-12 illustrate various commands that the cable clamp 100*a-n* is able to send to the gateway 165 to control one of the conference room devices 102. FIG. 10 illustrates an embodiment in which the cable clamp 100*a-n* is communicating wirelessly in a bidirectional manner with the gateway 165. The transceiver 160 transmits a power message 325 to switch one of the conference room devices 102 between a power "on" and "off" state in response to the user 305 activating a second actuator 320. In the power "off" state, the conference room 101 may be in a non-AV configuration.

FIG. 11 illustrates an embodiment in which the cable clamp 100*a-n* is communicating wirelessly in a bidirectional manner with the gateway 165. The transceiver 160 transmits a control message 335 to lower or raise the projector screen 77 in response to the user 305 activating the second actuator 320.

FIG. 12 illustrates an embodiment in which the cable clamp 100*a-n* is communicating wirelessly in a bidirectional manner with the gateway 165. The transceiver 160 transmits a dimmer message 350 to dim the lighting system device 71 in response to the user 305 activating the second actuator 320.

FIG. 13 is a flowchart 1100 illustrating a method in accordance with an illustrative embodiment of the present invention for communicating a computer to an integrated AV presentation system. In step 1105, a cable clamp 100*a-n* is provided for bidirectional communications with at least one conference room device 102. The cable clamp 100*a-n* includes top and bottom portions 245, 250 and first and second half members 110, 115. Each of the first and second half members 110, 115 includes first and second mating surfaces 120, 125, and interior and exterior surfaces 130, 135. The first and second half members 110, 115 are connected at the first mating surface 120 thereof such that the first and second half members 110, 115 form a passageway 140 for receiving a cable 145*a-n* therethrough.

In step 1110, the user 305 attaches the cable clamp 100*a-n* to the cable 145*a-n* by inserting the cable 145*a-n* through the passageway 140. In step 1115, the user 305 then mates the first and second half members 110, 115 to form the passageway 140. In step 1120, a free end of the cable 145*a-n* is connected into a port of a computer 380. In step 1125, a transceiver 160 receives a first status message 205 from a gateway 165 via a wireless link that indicates that an audio/video signal 215 is available in the cable 145*a-n*. In step 1126, the transceiver 160 transmits a command message 220 via the wireless link to the gateway 165 to accept the audio/video signal 215, in response to the user 305 actuating one of the least one actuator 150.

FIG. 14 includes additional steps that may be arranged in any manner to support operation in various configurations. More specifically, in step 1130, the user locks the two half members 110, 115 to maintain closure. In the closed position, the cable clamp 100*a-n* is able to slide freely relative to the cable 145*a-n*. In step 1135, the first indicator 155 is activated between an "on" state and an "off" state. The first indicator 155 allows the user 305 to recognize whether there is the audio/video signal 215 available in the cable 145*a-n*. The first indicator 155 is located on one of the exterior surfaces 135. The first indicator 155 is in the "on" state to indicate reception of the first status message 205 by the transceiver 160 and the first indicator 155 is in the "off" state to indicate non-reception of the first status message 205 by the transceiver 160.

In step 1140, second and third indicators 230, 235 are activated. The second and third indicators 230, 235 further assist the user 305 in setting up the computer 380 to connect to one of the conference room devices 102. The second and third indicators 230, 235 are located on one of the exterior surfaces 135. The second and third indicators 230, 235 display at least five states differentiated by color. The first colored state is off when the cable clamp 100*a-n* is in a powered "off" state. The second colored state is activated when the cable clamp 100*a-n* is in a powered "on" state. The third colored state is activated when the audio/video signal 215 is active in the cable 145*a-n* and selected by the gateway 165. The user 305 then activates the at least one actuator 150 to accept the audio/video signal 215. The fourth colored state is activated in response to the actuation. The fifth colored state is activated in response to the computer 380 transmitting informational data in the cable 145*a-n*.

In another embodiment, the user 305 prefers another signal besides the audio/video signal 215 that is initially active in the cable 145*a-n*. In step 1145, the transceiver 160 transmits a desired device command 295 for a desired device signal 287 to be available in the cable 145*a-n* via the wireless link to the gateway 165. In step 1150, a second status message 310 is received by the transceiver 160 via the wireless link from the gateway 165 that indicates that the desired device signal 287 is available in the cable 145*a-n*.

In step 1155, the cable clamp 100*a-n* is inserted into an opening of receptacle 255 for storing the cable clamp 100*a-n*. In step 1160, the energy storage device 355 is recharged by the receptacle 255.

It should be understood that the cable clamp 100*a-n* can be used in a new or existing conference room. However, the cable clamp 100*a-n* also can be used in other types of environment. Referring to FIG. 15, for example, the cable clamp 100*a-n* is used in a residential television environment 1400. The cable clamp 100*a-n* attaches to a VGA cable 145*a-n* that is connected to a television 82. The cable clamp 100*a-n* communicates wirelessly in a bidirectional manner with a wireless gateway (not shown). The wireless gateway (not shown) may be a Wi-Fi device that is built into the television 82.

Without the cable clamp 100*a-n*, when a user 305 switches to a VGA source using a remote controller 80, the television 82 displays "VGA No Video" or a similar message when there is no audio/video signal 215. With the cable clamp 100*a-n*, the user 305 is able to look at the indicator 155 to determine if the audio/video signal is available in the cable 145*a-n*. If the indicator 155 is in the "on" state, the audio/video signal 215 is available in the cable 145*a-n* and the user 305 may press one of the actuators 150 to accept the audio/video signal 215. The television 82 would not display the "VGA No Video" because the user 305 would not press the VGA signal on the remote controller 80 without confirmation from the cable clamp 100*a-n* that the audio/video signal 215 is available in the cable 145*a-n*.

FIG. 16 illustrates a system that includes a cable clamp-on device 100*a* to control conference room devices 102. The system includes a cable 145*a* that connects an A/V switcher 385 and a portable device 380 such as a laptop computer. The A/V switcher 385 monitors the presence of an A/V signal in the cable 145*a* and transmits data regarding said A/V signal presence.

A cable clamp-on device 100*a* is coupled to the cable 145*a*. The cable clamp-on device 100*a* includes at least one indicator 155 configured to display said A/V signal presence that is within the associated coupled cable 145a. The cable clamp-on device 100a also includes a transceiver 160 configured to receive the data via a wireless link. The data includes data regarding said A/V signal presence in the cable 145a.

FIG. 17 illustrates another embodiment of a system that includes multiple cable clamp-on devices 100a-n. As shown in FIG. 17, there are multiple portable devices/computers 380 that are connected to the A/V switcher 385 via cables 145a-n. Each of the cable clamp-on devices 100a-n is coupled to one of the cables 145a-n and communicates wirelessly via a wireless gateway 165.

The A/V control system 12 is connected in-between a wireless gateway 165 and the A/V switcher 385. The A/V control system 12 transmits and receives data, including the data regarding said A/V signal presence between the A/V switcher 385 and the cable clamp-on device 100a-n. Various conference room devices 102 are connected to the A/V control system 12 such as blinds/drapes 14 and lighting system device 71.

The A/V switcher 385 receives input signals from the multiple portable devices 380 via the respective cables 145a-n and outputs the signal to various conference room devices 102 such as a projector 16. The cable clamp-on device 100a-n includes at least one actuator 150 (see FIG. 4) to control the conference room device 102 (see FIG. 1).

Each of the cable clamp-on devices 100a-n is assigned a priority level 8 (see FIG. 19) for bidirectional communications in the event that more than one cable clamp-on device 100a-n is activated simultaneously. For example, in a conference room, there may be more than one user 305, each of whom has control over their own respective cable clamp-on device 100a-n and wants to show their presentation onto a projector screen via the projector 16. It is possible that more than one user may activate their respective actuator 150 simultaneously on their respective cable clamp-on device 100a-n to transmit the presentation data onto the projector 16. In this scenario, there is a conflict as to which user has the "right" to show their presentation. The conflict is resolved by assigning each of the cable clamp-on devices 100a-n a priority level. The user with the higher assigned priority level 8 on the cable clamp-on device 100a-n will have their presentation be displayed on the projector 16. The A/V control system 12 includes a scheduling unit 24 to enable/disable the cable clamp-on device 100a-n.

FIG. 18 illustrates a representative configuration of multiple teleconferencing sites 3a-n for remotely accessing conference room device 102. The multiple teleconferencing sites 3a-n may be located at one or multiple teleconferencing sites 3a-n for transmitting and receiving audio/video signal 215. Each teleconferencing site 3a-n includes conference room devices 102 such as DVD 6, local computers 5, user input device 22, CD player 10, projector 16, telephone 18, electronic white board 20, HVAC system 72, lighting system device 71, blinds/drapes 14, security 73, projector screen 77, audio system device 78, camera 2, and VCR 4. Each teleconferencing site 3a-n further includes 3a-n an audio/video control system 12 to control the conference room devices 102. It should be understood that teleconferencing sites 3a may have the same, more or less conference room devices as in teleconferencing site 3b.

A cable 145a-n is connected in-between a switcher 385 and a slave computer 380a-n. The slave computer 380a-n may be a laptop computer. Attached to each of the cables 145a-n is a cable clamp 100a-n for wireless communication in a bidirectional manner with the plurality of conference room devices 102. Each cable clamp 100a-n is assigned a priority level 8 (see FIG. 19) for bidirectional communications.

A scheduling unit 24 communicates with the audio/visual control system 12 and the cable clamps 100a-n. The scheduling unit 24 receives priority information, such as priority level 8 (FIG. 19) that is associated with each cable clamp 100a-n, from the master computer 103 and uses the priority information to manage conflicts. For example, when multiple cable clamps 100a-n are activated simultaneously, the scheduling unit 24 utilizes priority level 8 (FIG. 19) to enable or disable the cable clamps 100a-n for communicating wirelessly with the conference room devices 102. The scheduling unit 24 may be located locally at each teleconferencing site 3a-n or may be located remotely. The scheduling unit 24 is implemented as a website having menus and/or forms, which may be remotely accessed by a master user computer 103 to schedule facilities, equipment, and cable clamps 100a-n priority level 8 for a meeting or conference. The scheduling unit 24 may be accessed via a network, represented generally by reference numeral 104, which may be a local or wide area network, such as a corporate intranet or the internet. A scheduling unit 24 may also be located within each teleconferencing site 3a-n.

The scheduling unit 24 includes a database of available facilities 3a-n and associated conference room devices 102 and priority information of the cable clamps 100a-n. Conference room devices 102 may include DVD 6, local computers 5, user input device 22, CD player 10, projector 16, telephone 18, electronic white board 20, HVAC system 72, lighting system device 71, blinds/drapes 14, security 73, projector screen 77, audio system device 78, camera 2, and VCR 4. Conference room devices 102 are directly connected via a first interface to a local conference room control computer 5, which may be connected directly or indirectly to the site master computer 103 via a second interface. Alternatively, or in combination, local conference room control computers 5 may be connected to site coordinator computer 103 via a local or wide area network 104. Similarly, an A/V control system 12 may be connected to local conference room control computers 5 directly via a network 104 or indirectly via corresponding site coordinator computers 103 depending upon the particular application. The A/V control system 12 may provide audio and/or video conferencing connections between or among conference rooms located at the same site (conference rooms 3a, 3b for example) and/or remotely located conference rooms. One or more remotely located technical support or master computer 103 may be connected via network 104 to the scheduling unit 24, local computers 5, and/or local slave computers 380a-n for providing remote setup of the cable clamp 100a-n and troubleshooting.

Depending upon the particular application, the scheduling unit 24 may communicate scheduling information relative to the facilities, devices, and priority information of the cable clamps 100a-n to master computer 103, or may communicate directly with computers 5, 380. If an audio or video conference is requested, scheduling unit 24 may communicate directly with A/V control system 12 to schedule or reserve appropriate resources for the number and type (video/audio) of connections that were scheduled by user 305. Scheduling unit 24 may further disable or enable cable clamps 100a-n for bidirectional communications with conference room devices 102 based on priority level 8 when multiple cable clamps 100a-n transmit a signal simultaneously to control a conference room device 102 as will be further described in FIGS. 19-23.

The scheduling unit 24 includes a resource planning application including a user interface 26 displaying a priority account 28. FIG. 19 illustrates a representative screen of the priority account 28. The priority account 28 includes a listing of the teleconferencing sites 3a-n and priority level 8 for each cable clamp 100a-n in an entry 30. The priority level 8 is adjustable by the user 305. In other words, the user 305 can raise or lower the priority level 8. For example, teleconferencing site 3a is conference room A, which is located in Rockleigh, N.J., building 22, room 233. Conference room A has a priority level of 1, which is the highest priority level. Conference room A in Shanghai, China (building 1, room 2) has a priority level 3, which is the lowest priority level amongst the three teleconferencing sites 3a-n. In this example, any cable clamps 100a-n that are located in conference room A (Rockleigh, N.J., building 22, room 233) takes priority over the cable clamps 100a-n located in conference room A (Shanghai, China, building 1, room 2). In other words, if a cable clamp 100a-n in conference room A (Rockleigh, N.J., building 22, room 233) is activated at the same time as a cable clamp 100a-n in conference room A (Shanghai, China, building 1, room 2), the cable clamp 100a-n in conference room A (Rockleigh, N.J., building 22, room 233) is temporarily enabled for wireless communication while the cable clamp 100a-n in conference room A (Shanghai, China, building 1, room 2) is temporary disabled for communication.

FIG. 19 further illustrates the priority account 28 and includes an entry 30 for user 305 to adjust the priority level 8 that is associated with each of the cable clamps 100a-n. The priority account 28 further includes an availability status indicator 32 in another entry 34 that is associated with each cable clamp 100a-n. The availability status indicator 32 can also be changed by the user 305. Each cable clamp 100a-n is either in an "enabled" or "disabled" state of wireless communication with the conference room devices 102. The "enabled" or "disabled" state is in entry 34. The cable clamps 100a-n are configured for wireless communication with the plurality of conference room devices 102 based on the status indicator being in the "enabled" state of communication.

The user 305 may access the priority account 28 via the master computer 103 to accept, process, and transmit the assigned priority level 8 to the scheduling unit 24. The scheduling unit 24, in turn, enables or disables the cable clamps 100a-n for communicating wirelessly with the conference room devices 102 based on the assigned priority level 8. The user 305 may change the cable clamp 100a-n priority level 8 and status indicator 32. For example, the user 305 may change cable clamp 1 located in conference room B to a priority level of 1 and the status indicator 32 to be disabled.

It should be noted that the teleconferencing sites 3a-n can be different conference rooms that are located in the same or different facility, building, state or country.

FIG. 20 illustrates another example of a screen of the priority account 28. FIG. 20 is similar to FIG. 19 except that the priority level 8 of the cable clamps 100a-n are not grouped by location 3a-n but rather each cable clamp 100a-n is assigned a priority level 8 independent of the location 3a-n. For example, cable clamp #8, which is located in conference room A (Rockleigh, N.J., building 22, room 233) has an assigned priority level of 15 while cable clamp #15, which is located in conference room A (New York, N.Y., room 18) is assigned a priority level of 3. Therefore, if cable clamps #8 and #15 are activated or pressed simultaneously, cable clamp #15 is able to send a command message 220 while cable clamp #8 is temporarily disabled for wireless communication and hence is unable to send its command message. Cable clamp #8 is temporarily disabled for a short period of time (i.e., seconds or minutes) until cable clamp #15 sends its command message 220.

FIG. 21 is a flowchart illustrating operation of one embodiment of a system and method for controlling conference room devices 102 associated with a conference room 3a-n. The present invention is independent of the particular programming language, operating system, or computer platform which may be used to implement the invention. As such, the various steps or functions illustrated may be performed in the sequence illustrated, in parallel or in some cases omitted altogether. Likewise, the order of processing illustrated is not necessarily required to achieve the objects, features, and advantages of the invention, but is provided for ease of illustration and description.

The control logic of FIG. 21 is implemented in software which is executed by a microprocessor-based computer, such as a laptop or desktop computer, represented generally by computer 103 of FIG. 18. Of course, various portions or functions of the control logic may be implemented in software, hardware, or a combination of software and hardware. The flowchart of FIG. 21 illustrates one "loop" and its operations are repeated at periodic time intervals or as required by some internal or external event, as known by those of skill in the art. The control logic represented in FIG. 21 is embodied in data stored on a computer readable storage medium, such as a floppy disk, hard disk, CD-ROM, tape, or other magnetic, optical or combination device. The computer readable storage medium includes data representing instructions executable by a computer to generate commands for remotely controlling a computer according to the present invention.

In operation, a user 305 logs into a website via network 104 hosting scheduling unit 24 to determine availability and schedule conference room facilities 3a-n and devices 102. Scheduling unit 24 includes a database of available teleconferencing sites or facilities 3a-n and associated conference room devices 102. The available conference room devices 102 may be periodically or dynamically updated as devices are added or removed from particular conference rooms 3a-n. After selecting a date, time, location, and devices for a conference, scheduling unit 24 may perform a quality check or audit of scheduled equipment to assure that scheduled equipment is operational.

Typically in a teleconferencing environment, there are multiple participants located in various conference rooms, which may be located all over the world. In such an environment, each participant has a cable clamp 100a-n to control a conference room device 102. When more than one participant activate their respective cable clamps 100a-n simultaneously to control the same conference room device 102, a conflict occurs. For example, one participant may use one of the cable clamps 100a-n to request a signal source from the projector 16 to be displayed on a screen while another participant may request a signal source from the television 80 to be displayed on the screen. In this scenario, the conflict resolution technique is to allow the cable clamp 100a-n with the higher priority level 8 to display the desired signal source. This conflict resolution technique is illustrated in FIG. 21.

In step 1165 of FIG. 21, each of the cable clamps 100a-n receives an assigned priority level 8 and availability status from the scheduling unit 24. In step 1167, if the cable clamp 100a-n receives a status of being in a "disabled" state of communication, then the cable clamp 100a-n is disabled for bidirectional communications in step 1175. However, if the cable clamp 100a-n receives a status of being in an "enabled" state of communication, the cable clamp 100a-n is enabled for bidirectional communications in step 1170.

In step 1173, multiple cable clamps 100a-n may be pressed or activated simultaneously. When the plurality of cable clamps are assigned the "enabled" state and are activated simultaneously by at least one user, the cable clamp 100a-n with the higher priority level of communication is temporarily enabled for bidirectional communications while the lower priority level cable clamp is temporary disabled for communication in step 1180.

FIG. 22 is another flowchart illustrating operation of one embodiment of a system and method for controlling conference room devices 102 located in multiple teleconferencing sites 3a-n. In step 1165, each of the cable clamps 100a-n receives an assigned priority level and availability status from the scheduling unit 24. In step 1167, if the cable clamp 100a-n receives a status of being in a "disabled" state of communication, then the cable clamp 100a-n is disabled for bidirectional communications in step 1175. However, if the cable clamp 100a-n receives a status of being in an "enabled" state of communication, the cable clamp 100a-n is enabled for bidirectional communications in step 1170.

In step 1174, the cable clamp 100a-n determines whether a first status message 205 was received via the wireless link from the gateway 165 that indicates the audio/video signal 215 is in the cable 145a-n. If the cable clamp 100a-n did not receive the first message 205, then the cable clamp 100a-n activates the first indictor 155 to an "off" state to indicate non-reception of the first status message 205. The user 305 is able to obtain visual feedback as to whether the audio/video signal 215 is readily available in the cable 145a-n by looking at the first indicator 155.

If the cable clamp 100a-n receives the first message 205, in step 1126, the transceiver 160 transmits a command message 220 via the wireless link to the gateway 165 to accept the audio/video signal 215, in response to the user 305 actuating one of the least one actuator 150. In step 1135, the first indicator 155 is activated to an "on" state to indicate reception of the first status message 205 by the transceiver 160. In step 1140, second and third indicators 230, 235 are activated. The second and third indicators 230, 235 assist the user 305 in setting up the computer 380 to connect to one of the conference room devices 102.

In step 1173, multiple cable clamps 100a-n may be pressed or activated simultaneously. The cable clamp 100a-n with the higher priority level of communication is temporarily enabled for bidirectional communications while the lower priority level cable clamp is temporary disabled for communication in step 1180.

FIG. 23 is another flowchart illustrating operation of one embodiment of a system and method for controlling conference room devices 102 located in multiple teleconferencing sites 3a-n. FIG. 23 is similar to FIG. 22 with additional steps. After enabling the cable clamp 100a-n with the higher priority level of communication for bidirectional communications in step 1180, the transceiver 160 transmits a desired device command 295 for a desired device signal 287 to be available in the cable 145a-n via the wireless link to the gateway 165 in step 1145. In step 1150, a second status message 310 is received by the transceiver 160 via the wireless link from the gateway 165 that indicates that the desired device signal 287 is available in the cable 145a-n.

INDUSTRIAL APPLICABILITY

To solve the aforementioned problems, the present invention is a unique device, system, and method for handling and processing conflict resolution in a teleconferencing environment.

LIST OF ACRONYMS USED IN THE DETAILED DESCRIPTION OF THE INVENTION

The following is a list of the acronyms used in the specification in alphabetical order.

AV Audio Visual
CD Compact Disc
DVD Digital Video Disc or Digital Versatile Disc
DVI Digital Visual Interface
EEPROM Electrically Erasable Programmable Read-Only Memory
GUI Graphical User Interface
HDMI High-Definition Multimedia Interface
HVAC Heating, Ventilating, and Air Conditioning
ISM Industrial, Scientific and Medical
LCD Liquid Crystal Display
LED Light-Emitting Diode
OLED Organic Light Emitting Diode
RAM Random-access Memory
RF Radio Frequency
ROM Read-only Memory
UHF Ultra High Frequency
USB Universal Serial Bus
VCR Videocassette Recorder
VGA Video Graphics Array

ALTERNATE EMBODIMENTS

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

For example, any of the flow diagrams described herein may be modified or arranged in any manner to support operation in various configurations. The flow diagrams may include more or fewer blocks, combined or separated blocks, alternative flow arrangements, or the like. The flow diagrams may also be implemented in the form of hardware, firmware, or software. If implemented in software, the software may be written in any suitable code in accordance with the example embodiments herein or other embodiments. The software may be stored in any form of computer readable medium and loaded and executed by a general purpose or application specific processor suitable to perform the example embodiments described herein or other embodiments.

What is claimed is:

1. A system, comprising:
   (a) an A/V switcher being configured to monitor a presence of an A/V signal in a cable (145a-n) and transmit data regarding said A/V signal presence; and
   (b) a cable clamp-on device (100a-n) being coupled to the cable and including,
      (i) at least one indicator (155) configured to display said A/V signal presence, and
      (ii) a transceiver (160) configured to receive the data regarding said A/V signal presence.

2. The system of claim 1, wherein the cable has a first end and a second end, the first end being connected to a portable device (380) and the second end being connected to an A/V switcher (385).

3. The system of claim 1, further comprising an A/V control system (12) configured to transmit and receive data, including the data regarding said A/V signal presence between the A/V switcher and the cable clamp-on device.

4. The system of claim 3, wherein:
   (a) the cable clamp-on device further comprises at least one actuator (150) configured to control a conference room device (102), and (b) the A/V control system is configured to (i) receive the data in response to the at least one actuator being activated and (ii) transmit the data to the conference room device.

5. The system of claim 4, wherein the conference room device comprises at least one of:
(a) an Audio/Visual (AV) device;
(b) a switch device,
(c) a gateway device,
(d) a HVAC system,
(e) a lighting system device,
(f) a shading system device,
(g) a projector device,
(h) a projector screen,
(i) a DVD,
(j) a user input device,
(k) a CD player,
(l) a security system device, or
(m) an A/V control system.

6. The system of claim 1, wherein the cable clamp-on device being assigned a priority level (8) for bidirectional communications with a conference room device (102).

7. The system of claim 1, further comprising:
(a) at least a second cable (145a-n) having a first end and a second end, the first end being connected to another portable device (380) and the second end being connected to the A/V switcher;
(b) the A/V switcher being configured to monitor a presence of an A/V signal in the at least second cable and transmit data regarding said A/V signal presence; and
(c) at least a second cable clamp-on device (100a-n) being coupled to the respective at least second cable and including,
(i) at least one indicator (155) configured to display said A/V signal presence within the associated at least second coupled cable, and
(ii) a transceiver (160) configured receive the data, via the wireless link, the data regarding said A/V signal presence,
(d) wherein the at least second cable clamp-on device being assigned a priority level for bidirectional communications with a conference room device.

8. The system of claim 7, wherein the A/V control system further comprises a scheduling unit (24), wherein the scheduling unit is configured to enable/disable the cable clamp-on device and the at least second cable clamp-on device for communicating wirelessly with the conference room device based on the assigned priority level when the cable clamp-on device and the at least second cable clamp-on device are activated simultaneously.

\* \* \* \* \*

UNITED STATES PATENT AND TRADEMARK OFFICE
CERTIFICATE OF CORRECTION

PATENT NO. : 8,604,938 B2  Page 1 of 1
APPLICATION NO. : 13/764216
DATED : December 10, 2013
INVENTOR(S) : Feldstein et al.

It is certified that error appears in the above-identified patent and that said Letters Patent is hereby corrected as shown below:

On the Title Page

At Item (73) Assignee: Column 1, Line 16, delete "Creston Electronics Inc."
and insert -- Crestron Electronics Inc. --

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*